US012467313B2

(12) United States Patent
Huang

(10) Patent No.: US 12,467,313 B2
(45) Date of Patent: Nov. 11, 2025

(54) WINDOW SHADE AND ACTUATING SYSTEM THEREOF

(71) Applicant: Teh Yor Co., Ltd., New Taipei (TW)

(72) Inventor: Chung-Chen Huang, New Taipei (TW)

(73) Assignee: Teh Yor Co., Ltd., New Taipei (TW)

( * ) Notice: Subject to any disclaimer, the term of this patent is extended or adjusted under 35 U.S.C. 154(b) by 365 days.

(21) Appl. No.: 18/446,317

(22) Filed: Aug. 8, 2023

(65) Prior Publication Data

US 2024/0052696 A1 Feb. 15, 2024

Related U.S. Application Data

(60) Provisional application No. 63/370,884, filed on Aug. 9, 2022.

(51) Int. Cl.
*E06B 9/322* (2006.01)
*E06B 9/262* (2006.01)

(52) U.S. Cl.
CPC .............. *E06B 9/322* (2013.01); *E06B 9/262* (2013.01); *E06B 2009/2627* (2013.01); *E06B 2009/3225* (2013.01)

(58) Field of Classification Search
CPC .... E06B 9/322; E06B 9/362; E06B 2009/285; E06B 2009/2627; E06B 2009/3222
See application file for complete search history.

(56) References Cited

U.S. PATENT DOCUMENTS

| | | | | |
|---|---|---|---|---|
| 8,356,653 | B2 * | 1/2013 | Fu-Lai | E06B 9/322 160/84.05 |
| 9,062,492 | B2 * | 6/2015 | Yu | E06B 9/322 |
| 9,187,951 | B2 * | 11/2015 | Yu | E06B 9/90 |
| 9,284,774 | B2 * | 3/2016 | Yu | E06B 9/322 |
| 9,528,318 | B2 * | 12/2016 | Huang | E06B 9/262 |

(Continued)

FOREIGN PATENT DOCUMENTS

| | | | | |
|---|---|---|---|---|
| CA | 3169259 | A1 * | 5/2018 | E06B 9/50 |
| JP | 2022-59836 | A | 4/2022 | |

(Continued)

OTHER PUBLICATIONS

International Search Report in the related PCT application No. PCT/US2023/029767, dated Dec. 21, 2023.

(Continued)

*Primary Examiner* — Johnnie A. Shablack

(74) *Attorney, Agent, or Firm* — Chen Yoshimura LLP

(57) ABSTRACT

An actuating system for a window shade includes a transmission axle rotatable about a longitudinal axis thereof, a braking spring having an engaged state adapted to prevent rotation of the transmission axle and a release state allowing rotation of the transmission axle, and a brake actuating mechanism that is connected to the braking spring and includes a switching actuator and a position selector. The position selector has a first hold position for holding the braking spring in the engaged state and a second hold position for holding the braking spring in the release state. The position selector is switchable from the first hold position to the second hold position or from the second hold position to the first hold position through a back-and-forth movement of the switching actuator between an initial state and an actuating state.

19 Claims, 25 Drawing Sheets

(56) References Cited

U.S. PATENT DOCUMENTS

| | | | | |
|---|---|---|---|---|
| 9,765,864 | B2 * | 9/2017 | Yu | E06B 9/78 |
| 9,938,764 | B2 * | 4/2018 | Huang | F16H 3/54 |
| 11,713,620 | B2 * | 8/2023 | Marocco | E06B 9/76<br>160/309 |
| 11,767,712 | B2 * | 9/2023 | Huang | E06B 9/322<br>160/84.02 |
| 11,879,294 | B2 * | 1/2024 | Huang | E06B 9/262 |
| 12,139,966 | B2 * | 11/2024 | Huang | E06B 9/262 |
| 2012/0048485 | A1 | 3/2012 | Yu et al. | |
| 2015/0376944 | A1 | 12/2015 | Huang et al. | |
| 2016/0017964 | A1 | 1/2016 | Yu et al. | |
| 2021/0222489 | A1 | 7/2021 | Huang et al. | |
| 2022/0389758 | A1 * | 12/2022 | Marocco | E06B 9/74 |
| 2024/0052696 | A1 * | 2/2024 | Huang | E06B 9/322 |

FOREIGN PATENT DOCUMENTS

| | | | | | |
|---|---|---|---|---|---|
| JP | 2022-78169 | A | | 5/2022 | |
| KR | 20240144306 | A | * | 10/2024 | E06B 9/326 |
| TW | 201414915 | A | | 4/2014 | |
| TW | 201546359 | A | | 12/2015 | |
| WO | WO-2018191631 | A1 | * | 10/2018 | E06B 9/56 |

OTHER PUBLICATIONS

Written Opinion in the related PCT application No. PCT/US2023/029767, dated Dec. 21, 2023.

Taiwanese Office Action, dated Jan. 17, 2024, in a relatedTaiwanese patent application, No. TW 112129669. (English translation of the search report is attached.).

* cited by examiner

312

WINDOW SHADE AND ACTUATING SYSTEM THEREOF

CROSS-REFERENCE TO RELATED APPLICATION(S)

This application claims priority to U.S. provisional patent application No. 63/370,884 filed on Aug. 9, 2022, the disclosure of which is hereby incorporated by reference.

BACKGROUND

1. Field of the Invention

The present invention relates to window shades, and actuating systems used in window shades.

2. Description of the Related Art

Some window shades may use an operating cord for raising a bottom part of the window shade and a wand for lowering the bottom part. More specifically, the operating cord may be pulled downward to drive a rotary part in rotation, which can be transmitted to a drive axle so that the drive axle can rotate for winding a suspension cord connected with the bottom part. When a user rotates the wand, an arrester coupled to the wand can release the drive axle, which can accordingly rotate as the bottom part lowers under gravity action.

In the aforementioned type of window shades, the braking force of the arrester may create resistance against the rotation of the drive axle when the rotary part and the drive axle rotate for raising the bottom part. As a result, the pulling force applied by the user has to overcome the braking force to be able to raise the bottom part, which may require increased effort from the user.

SUMMARY

The present application describes a window shade and an actuating system for use with the window shade that can reduce internal friction and can be conveniently operated with reduced effort.

According to an embodiment, an actuating system for a window shade includes a transmission axle rotatable about a longitudinal axis thereof, a braking spring having an engaged state adapted to prevent rotation of the transmission axle and a release state allowing rotation of the transmission axle, and a brake actuating mechanism that is connected to the braking spring and includes a switching actuator and a position selector. The switching actuator is movable between an initial state and an actuating state. The position selector has a first hold position for holding the braking spring in the engaged state and a second hold position for holding the braking spring in the release state. The brake actuating mechanism is configured to cause the position selector to switch from the first hold position to the second hold position through a back-and-forth movement of the switching actuator between the initial state and the actuating state, and to cause the position selector to switch from the second hold position to the first hold position through another back-and-forth movement of the switching actuator between the initial state and the actuating state.

Moreover, the present application provides a window shade that can incorporate the actuating system.

BRIEF DESCRIPTION OF THE DRAWINGS

FIGS. 13A-15A are schematic views illustrating exemplary operation for switching the position selector from a first hold position to a second hold position;

FIGS. 13B-15B are schematic views illustrating the protrusion of the engaging element moved to different positions along the guide track of the anchoring part during switching of the position selector from the first hold position to the second hold position;

DETAILED DESCRIPTION OF THE EMBODIMENTS

Figure 1:
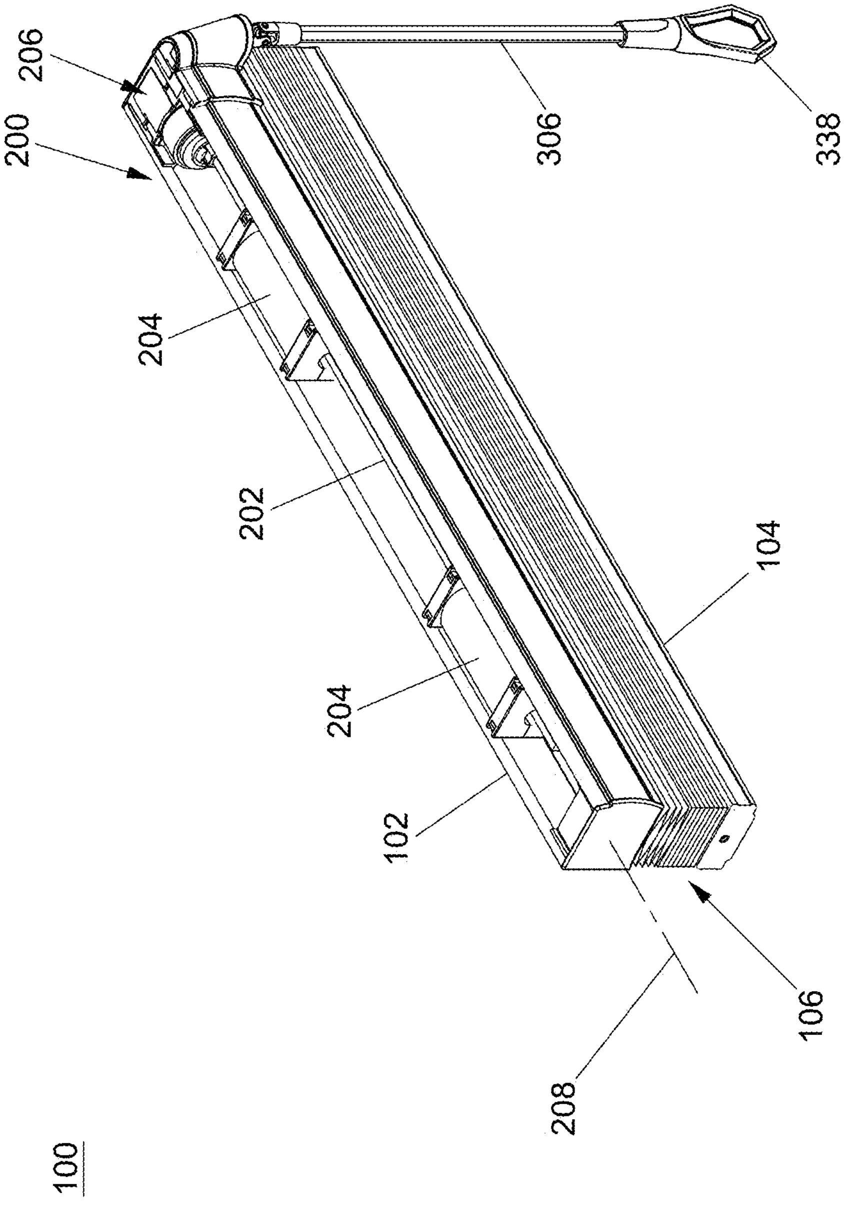
FIG. 1 is a perspective view illustrating an embodiment of a window shade.
Figure 2:
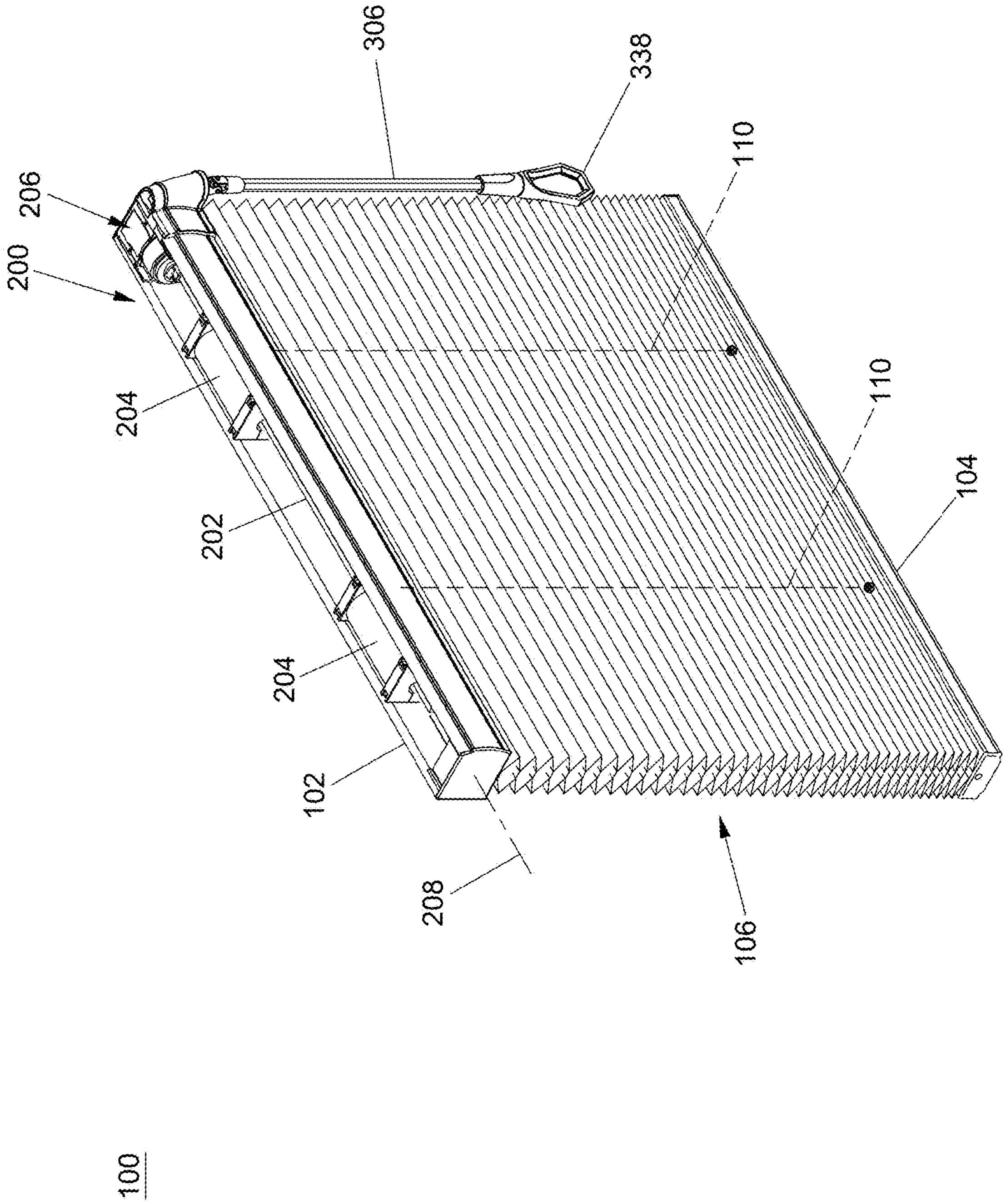
FIG. 2 is a perspective view illustrating the window shade of FIG. 1 having a movable rail lowered from a head rail.

FIGS. 1 and 2 are perspective views illustrating an embodiment of a window shade 100 in different states.

Referring to FIGS. 1 and 2, the window shade 100 can include a head rail 102, a movable rail 104, a shading structure 106 and an actuating system 200. The window shade 100 is shown in a retracted or raised state in FIG. 1, and in an expanded or lowered state in FIG. 2.

The head rail 102 may be affixed at a top of a window frame, and can have any desirable shapes. According to an example of construction, the head rail 102 can have an elongate shape including a cavity for at least partially receiving the actuating system 200 of the window shade 100.

The movable rail 104 can be suspended from the head rail 102 with a plurality of suspension elements 110 (shown with phantom lines in FIG. 2). According to an example of construction, the movable rail 104 may be an elongate rail having a channel adapted to receive to the attachment of the shading structure 106. Examples of the suspension elements 110 may include, without limitation, cords, strips, bands, and the like. According to an example, the movable rail 104 may be a bottom rail of the window shade 100. However, it will be appreciated that other shade elements may be provided below the movable rail 104 as needed.

The shading structure 106 is disposed between the head rail 102 and the movable rail 104, and may have any suitable structure that can be expanded and collapsed between the head rail 102 and the movable rail 104. According to an example of construction, the shading structure 106 can have a cellular structure, which may include, without limitation, honeycomb structures. During use, the shading structure 106 can be suspended from the head rail 102, and can be expanded or collapsed by displacing the movable rail 104 away from or toward the head rail 102.

Referring to FIGS. 1 and 2, the movable rail 104 can move vertically relative to the head rail 102 for setting the window shade 100 to a desirable configuration. For example, the movable rail 104 may be raised toward the head rail 102 to collapse the shading structure 106 as shown in FIG. 1, or lowered away from the head rail 102 to expand the shading structure 106 as shown in FIG. 2. The vertical position of the movable rail 104 relative to the head rail 102 may be controlled with the actuating system 200.

Referring to FIGS. 1 and 2, the actuating system 200 is assembled with the head rail 102, and is operable to displace the movable rail 104 relative to the head rail 102 for adjustment. The actuating system 200 can include a transmission axle 202, a plurality of winding units 204 rotationally coupled to the transmission axle 202, and a control module 206 coupled to the transmission axle 202.

The transmission axle 202 and the winding units 204 can be assembled with the head rail 102. The transmission axle 202 is coupled to the winding units 204, and can rotate about a longitudinal axis 208 of the transmission axle 202. Each of the winding units 204 is connected to the movable rail 104 via at least one suspension element 110, and is operable to wind the suspension element 110 for raising the movable rail 104 and to unwind the suspension element 110 for lowering the movable rail 104. For example, the winding unit 204 may include a rotary drum (not shown) that is rotationally coupled to the transmission axle 202 and is connected to one end of the suspension element 110, and another end of the suspension element 110 can be connected to the movable rail 104, whereby the rotary drum can rotate along with the transmission axle 202 to wind or unwind the suspension element 110. Since the winding units 204 are commonly coupled to the transmission axle 202, the winding units 204 can operate in a concurrent manner for winding and unwinding the suspension elements 110.

The control module 206 is coupled to the transmission axle 202, and is operable to cause the transmission axle 202 to rotate in either direction about the longitudinal axis 208 for raising or lowering the movable rail 104. In conjunction with FIGS. 1 and 2, FIG. 3 is an exploded view illustrating a construction of the control module 206, and FIG. 4 is a cross-sectional view of the control module 206.

Referring to FIGS. 1-4, the control module 206 can include a housing 210 that can be affixed to the head rail 102. The housing 210 can have a cavity 210A adapted to receive at least some component parts of the control module 206. According to an example of construction, the housing 210 may include two casing portions 212A and 212B that are attached to each other to define at least partially the cavity 210A, and a cover 212C and a bracket 212D that may be affixed to the casing portion 212A to close the cavity 210A at one side thereof.

Figure 3:
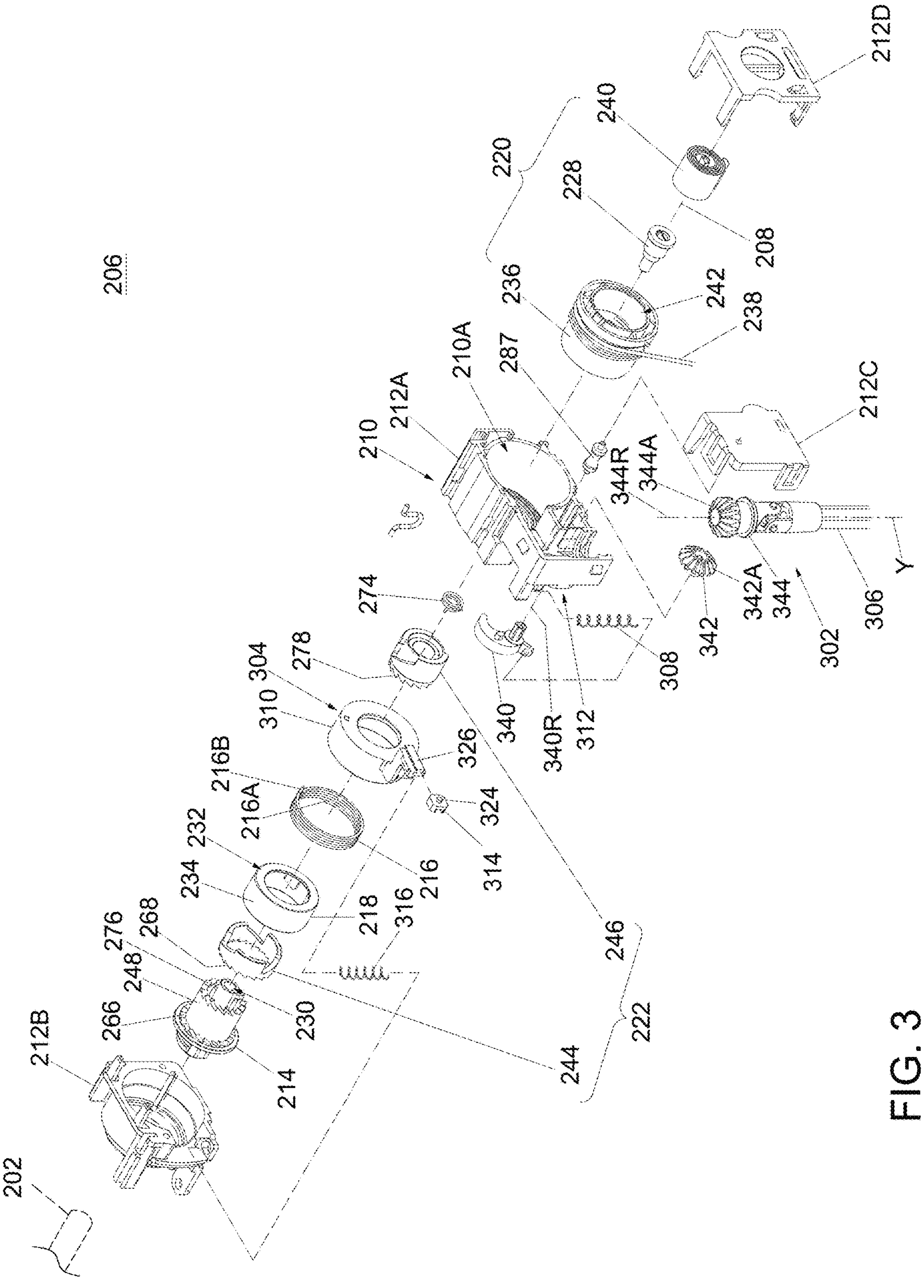
FIG. 3 is an exploded view illustrating the construction of a control module provided in an actuating system for a window shade.
Figure 4:
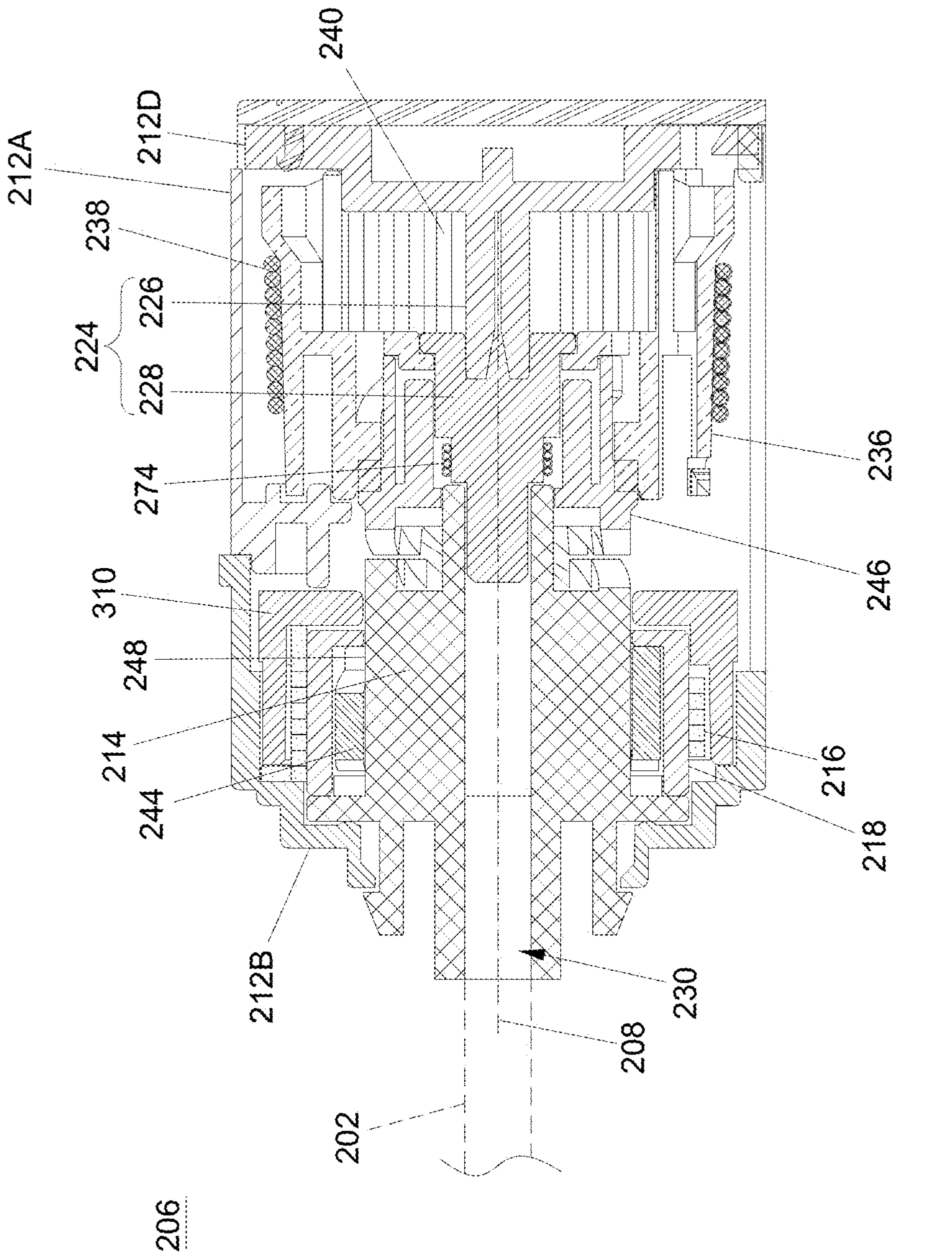
FIG. 4 is a cross-sectional view of the control module shown in FIG. 3.

Referring to FIGS. 3 and 4, the control module 206 can include an axle adapter 214, a braking spring 216, a brake engaging part 218, a lift actuating module 220 and a clutching mechanism 222, all of which can be assembled with the housing 210.

For facilitating the assembly of the different component parts, the housing 210 can include a fixed shaft 224 having multiple sections of different sizes. According to an example of construction, the fixed shaft 224 can include a lug 226 fixedly connected to the bracket 212D, and a shaft portion 228 fixedly attached to the lug 226. The lug 226 and the shaft portion 228 can be substantially coaxial to the longitudinal axis 208. It will be appreciated that the lug 226 and the shaft portion 228 may also be provided as a single part, which can be attached to or formed integrally with the bracket 212D.

The axle adapter 214 can be received at least partially inside the cavity 210A of the housing 210, and can extend outward through the casing portion 212B. According to an example of construction, the axle adapter 214 may be provided as a unitary part of an elongate shape. The axle adapter 214 may be pivotally connected about the fixed shaft 224 with the shaft portion 228 thereof inserted into a hole 230 provided in the axle adapter 214.

The axle adapter 214 is rotationally coupled to the transmission axle 202 so that the transmission axle 202 and the axle adapter 214 can rotate in unison about the longitudinal axis 208 relative to the housing 210. For example, an end of the transmission axle 202 can be inserted into the hole 230 at a side of the axle adapter 214 opposite to the fixed shaft 224. A fastener (not shown) may be used to securely attach the transmission axle 202 to the axle adapter 214. Accordingly, the axle adapter 214 can be rotationally coupled to the winding units 204 via the transmission axle 202, and the transmission axle 202 and the axle adapter 214 can rotate in unison about the longitudinal axis 208 for raising and lowering the movable rail 104.

The braking spring 216 has an engaged state adapted to prevent rotation of the transmission axle 202, and a release state allowing rotation of the transmission axle 202. More specifically, the braking spring 216 can apply a braking force adapted to prevent rotation of the brake engaging part 218 in the engaged state. According to an example of construction, the braking spring 216 and the brake engaging part 218 are disposed around the longitudinal axis 208. For example, the brake engaging part 218 can have a hollow interior 232 and can be disposed around an intermediate portion of the axle adapter 214, which passes through the hollow interior 232 leaving a gap between the intermediate portion of the axle adapter 214 and the brake engaging part 218. During operation, the axle adapter 214 thus can rotate relative to the brake engaging part 218.

The braking spring 216 can be disposed around the brake engaging part 218 in contact with an outer surface 234 thereof, and can apply a braking force on the brake engaging part 218 for preventing rotation of the brake engaging part 218 about the longitudinal axis 208. For example, the outer surface 234 may be defined on a ring portion of the brake engaging part 218, and the braking spring 216 can include a torsion spring mounted around the ring portion of the brake engaging part 218 in frictional contact with the outer surface 234. In the engaged state, the braking spring 216 can tighten and apply a braking force on the brake engaging part 218 via the frictional contact between the braking spring 216 and the outer surface 234 of the brake engaging part 218. In the release state, the braking spring 216 can expand so as to loosen the frictional contact between the braking spring 216 and the outer surface 234 of the brake engaging part 218.

Referring to FIGS. 3 and 4, the lift actuating module 220 can include a spool 236 connected to an operating part 238, and a spring 240 connected to the spool 236. The operating part 238 can be a flexible element of a linear shape, and can have an end anchored to the spool 236. Examples of the operating part 238 can include, without limitation, a cord or a tape. The spool 236 is pivotally connected to the housing 210, and is rotatable in a winding direction to wind the operating part 238 and in an unwinding direction to unwind the operating part 238. According to an example of construction, the spool 236 may be pivotally connected around the fixed shaft 224, whereby the spool 236 can rotate about the longitudinal axis 208 for winding and unwinding the operating part 238.

The spring 240 is connected to the spool 236, and is adapted to bias the spool 236 to rotate in the winding direction. According to an example of construction, the spool 236 can have a cavity 242 through which passes the fixed shaft 224, and the spring 240 can be disposed around the fixed shaft 224 inside the cavity 242 with two ends of the spring 240 being respectively connected to the fixed shaft 224 (e.g., at the lug 226) and the spool 236. The lift actuating module 220 may be operable to raise the movable rail 104 by pulling the operating part 238 so that the spool 236 rotates in the unwinding direction. When the operating part 238 is released, the spring 240 can urge the spool 236 to rotate for winding at least partially the operating part 238.

The clutching mechanism 222 is configured to selectively couple the axle adapter 214 to either one of the lift actuating module 220 and the brake engaging part 218, wherein the clutching mechanism 222 is operable to couple the axle adapter 214 to the spool 236 of the lift actuating module 220 and decouple the axle adapter 214 from the brake engaging part 218 in response to a rotation of the spool 236 in the unwinding direction, and decouple the axle adapter 214 from the spool 236 and couple the axle adapter 214 to the brake engaging part 218 when the spool 236 rotates in the winding direction. Accordingly, the axle adapter 214 and the spool 236 can concurrently rotate relative to the brake engaging part 218 free of the braking force applied by the braking spring 216, when the spool 236 rotates in the unwinding direction. This may facilitate raising of the movable rail 104 and reduce friction between component parts. When the spool 236 rotates in the winding direction, the braking force of the braking spring 216 in the engaged state can be exerted through the brake engaging part 218 and the clutching mechanism 222 to the axle adapter 214, and thus is adapted to prevent a rotation of the axle adapter 214 and the transmission axle 202. The movable rail 104 can be thereby held at a desired position relative to the head rail 102. As described hereinafter, the clutching mechanism 222 can include two clutching parts 244 and 246 that are movable relative to the brake engaging part 218 and the spool 236 to selectively couple the axle adapter 214 to either one of the spool 236 and the brake engaging part 218.

Figure 5:
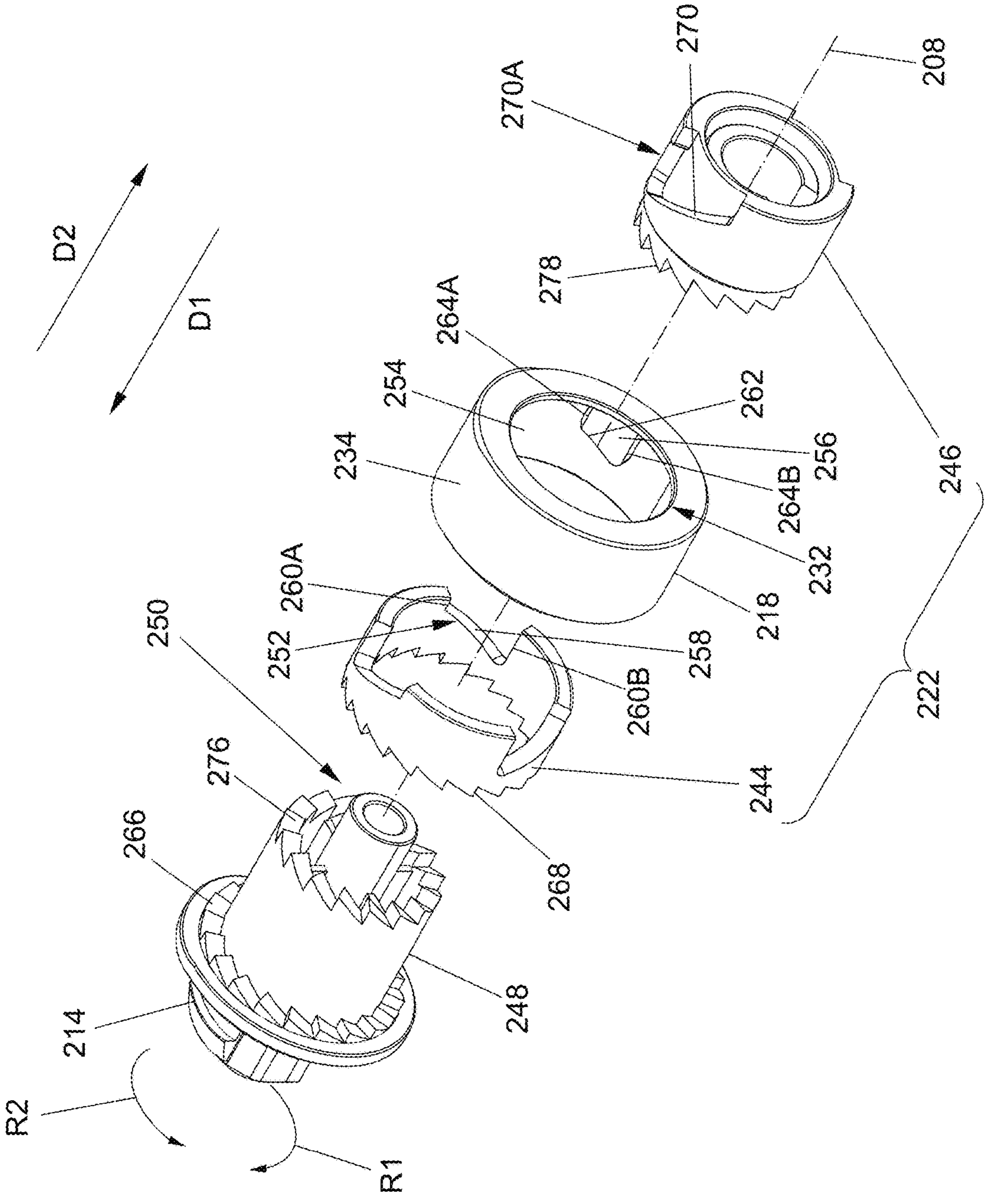
FIG. 5 is an exploded view illustrating construction details of a clutching mechanism provided in the control module.

In conjunction with FIGS. 3 and 4, FIG. 5 is an exploded view illustrating some construction details of the clutching mechanism 222. Referring to FIGS. 3-5, the brake engaging part 218 and the clutching part 244 can be disposed around an intermediate portion 248 of the axle adapter 214, and the other clutching part 246 can be disposed adjacent to an end 250 of the axle adapter 214. The clutching part 244 can be coupled to the brake engaging part 218, and is movable relative to the axle adapter 214 and the brake engaging part 218 between a disengaged position where the clutching part 244 is disengaged from the axle adapter 214 and an engaged position where the clutching part 244 is engaged with the axle adapter 214. The clutching part 246 can be coupled to the spool 236, and is movable relative to the axle adapter 214 and the spool 236 between a disengaged position where the clutching part 246 is disengaged from the axle adapter 214 and an engaged position where the clutching part 246 is engaged with the axle adapter 214.

The controlled movements of the two clutching parts 244 and 246 allow to switch the coupling state of the axle adapter 214 with respect to the brake engaging part 218 and the spool 236 of the lift actuating module 220. More specifically, the clutching mechanism 222 is configured so that a rotation of the spool 236 in the unwinding direction causes the clutching part 246 to move to the engaged position and causes the clutching part 244 to move to the disengaged position, whereby the spool 236, the axle adapter 214 and the clutching part 246 are concurrently rotatable relative to the brake engaging part 218. Moreover, the clutching mechanism 222 is configured so that a rotation of the spool 236 in the winding direction causes the clutching part 246 to move to the disengaged position, and the clutching part 244 can be switched to the engaged position while the clutching part 246 is disengaged from the axle adapter 214 so that the braking force of the braking spring 216 is adapted to prevent a rotation of the axle adapter 214.

Each of the clutching parts 244 and 246 may be a single movable part. According to an example of construction, the two clutching parts 244 and 246 are configured to slide along the longitudinal axis 208 in opposite directions to selectively couple the axle adapter 214 to either one of the spool 236 and the brake engaging part 218. For example, the clutching part 244 can have a ring shape, and the intermediate portion 248 of the axle adapter 214 can be disposed through the clutching part 244 so that the clutching part 244 can slide along the intermediate portion 248 relative to the axle adapter 214. The clutching part 246 can likewise have a ring shape, and can be disposed to slide along the shaft portion 228 of the fixed shaft 224.

Referring to FIGS. 3-5, the clutching part 244 is coupled to the brake engaging part 218, and is movable between the disengaged position and the engaged position in sliding contact with the brake engaging part 218. According to an example of construction, the clutching part 244 can be disposed around the intermediate portion 248 of the axle adapter 214 and at least partially received in the hollow interior 232 of the brake engaging part 218. The connection between the brake engaging part 218 and the clutching part 244 allows a limited displacement of the clutching part 244 relative to the brake engaging part 218 between the disengaged position and the engaged position. To this end, the clutching part 244 can be in sliding contact with the brake engaging part 218 inside the hollow interior 232 via at least one ramp surface provided on the clutching part 244 or the brake engaging part 218. For example, the clutching part 244 can have a notch 252 disposed eccentric from the longitudinal axis 208, and an inner wall 254 of the brake engaging part 218 at least partially delimiting the hollow interior 232 thereof can have a protrusion 256 that is restricted to slide within the notch 252. The notch 252 of the clutching part 244 can include a ramp surface 258 extending between two stop surfaces 260A and 260B, the protrusion 256 of the brake engaging part 218 can have a ramp surface 262 extending between two stop surfaces 264A and 264B, and the clutching part 244 can be disposed with the ramp surface 258 in sliding contact with the ramp surface 262.

With the aforementioned construction, the clutching part 244 can move relative to the brake engaging part 218 between the disengaged position and the engaged position with the ramp surface 258 in sliding contact with the ramp surface 262. More specifically, the clutching part 244 can concurrently rotate about and slide along the longitudinal axis 208 for switching between the disengaged position and the engaged position, the protrusion 256 of the brake engaging part 218 being displaced between the two stop surfaces 260A and 260B of the notch 252 during the movement of the clutching part 244 relative to the brake engaging part 218. When the clutching part 244 is in the disengaged position, the axle adapter 214 is rotatable about the longitudinal axis 208 while the brake engaging part 218 and the clutching part 244 remain generally stationary. When the clutching part 244 is in the engaged position, the axle adapter 214 and the clutching part 244 are rotationally coupled to each other, and the braking force applied by the braking spring 216 on the brake engaging part 218 is adapted to prevent a rotation of the axle adapter 214 and the clutching part 244 via a contact between the stop surface 260A of the clutching part 244 and the stop surface 264A of the brake engaging part 218.

Referring to FIGS. 3-5, the axle adapter 214 can include a plurality of teeth 266 disposed around the longitudinal axis 208, and the clutching part 244 can include a plurality of teeth 268 disposed around the longitudinal axis 208. The teeth 268 can be engaged with the teeth 266 when the clutching part 244 is in the engaged position, and disengaged from the teeth 266 when the clutching part 244 is in the disengaged position. The teeth 266 may be disposed along a first circumference of the axle adapter 214 at an end of its intermediate portion 248, and the teeth 268 may be disposed along a circular edge of the clutching part 244 that extends around the intermediate portion 248 facing the teeth 266 of the axle adapter 214. The teeth 266 and 268 may have a saw-tooth pattern. When the clutching part 244 is in the engaged position, the engagement between the teeth 266 and 268 allows torque transmission from the axle adapter 214 to the clutching part 244 in only one direction R1 and allows rotation of the axle adapter 214 relative to the clutching part 244 in a direction R2 opposite to the direction R1. The direction R1 corresponds to a direction of rotation that would move the stop surface 260A of the clutching part 244 toward the stop surface 264A of the brake engaging part 218. A torque in the direction R1 can be created by the suspended load of the movable rail 104. When the clutching part 244 is in the engaged position, the braking force of the braking spring 216 can oppose a torque in the direction R1 to hold the movable rail 104 in position. When the axle adapter 214 rotates in the direction R2, the configuration of the teeth 266 and 268 is so that the axle adapter 214 can push the clutching part 244 to move away from the engaged position to the disengaged position.

Referring to FIGS. 3-5, the clutching part 246 is coupled to the spool 236 of the lift actuating module 220, and is movable between the disengaged position and the engaged position in sliding contact with the spool 236. According to an example of construction, the clutching part 246 can be disposed around the shaft portion 228 and at least partially received in a hollow interior of the spool 236. The clutching part 246 can be coupled to the spool 236 via a sliding connection configured so that a rotation of the spool 236 in the unwinding direction (i.e., for unwinding the operating part 238) causes the clutching part 246 to slide toward the axle adapter 214 to the engaged position, and a rotation of the spool 236 in the winding direction (i.e., for winding the operating part 238) causes the clutching part 246 to slide away from the axle adapter 214 to the disengaged position. The sliding connection between the spool 236 and the clutching part 246 can be carried out via at least one ramp surface provided on the clutching part 246 or the spool 236.

Figure 6:
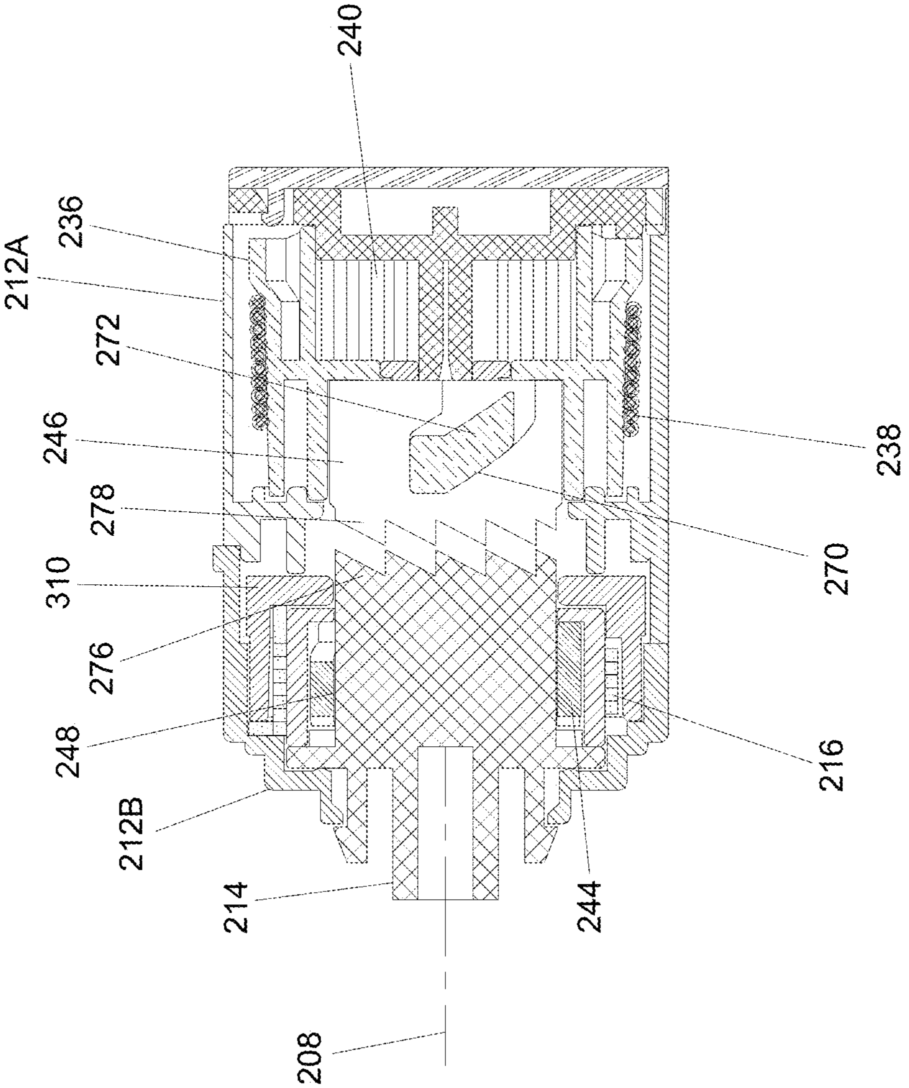
FIGS. 6 and 7 are partial cross-sectional views illustrating an example of a sliding connection between a clutching part of the clutching mechanism and a spool of a lift actuating module.
Figure 7:
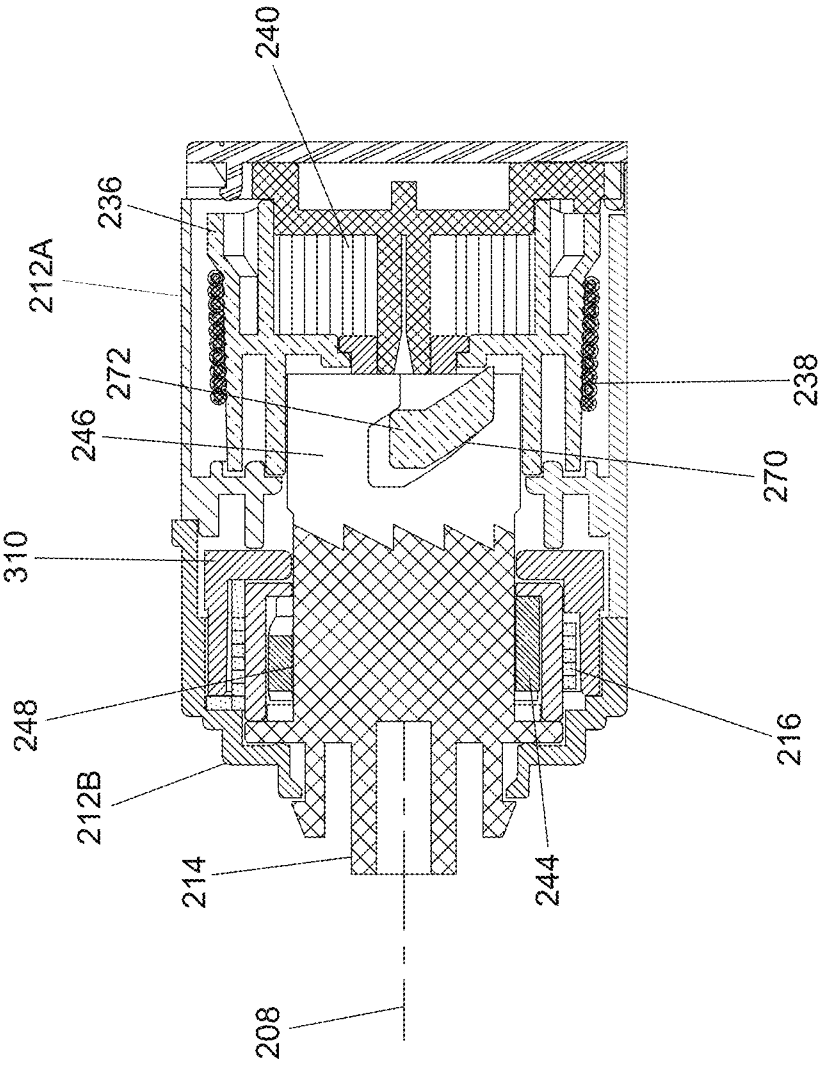
Figure 8:
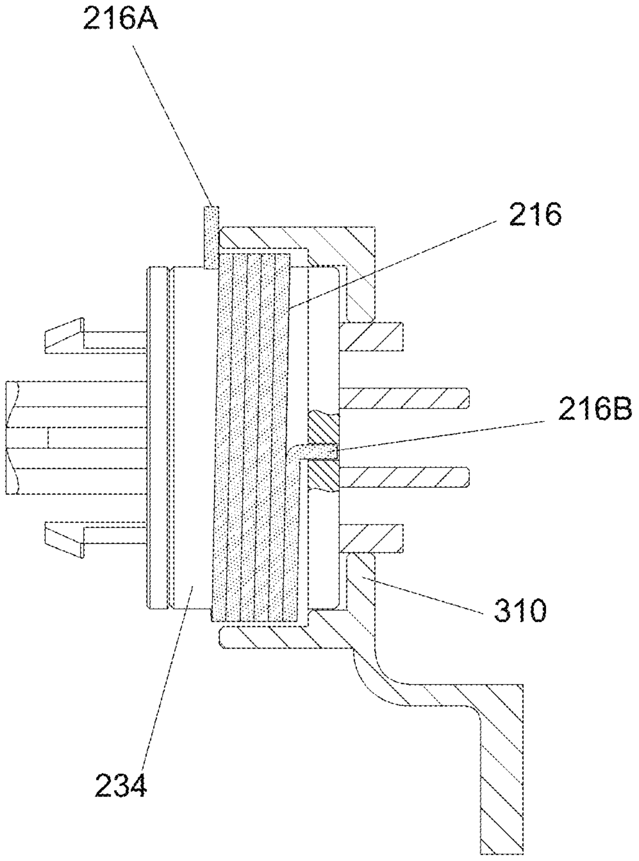
FIG. 8 is a schematic view illustrating some construction details of the connection between a braking spring and a spring coupler in the control module of FIG. 3.

FIGS. 6 and 7 are partial cross-sectional views illustrating an example of a sliding connection between the spool 236 and the clutching part 246. Referring to FIGS. 3-7, the clutching part 246 can have a ramp surface 270 radially distant from the longitudinal axis 208, and the spool 236 can have a protrusion 272 in sliding contact with the ramp surface 270. The ramp surface 270 may be exemplary defined on an edge of a slot 270A provided on a circumferential surface of the clutching part 246, and the protrusion 272 may be provided on an inner wall of the spool 236. It will be appreciated the sliding connection may also be achieved by providing the ramp surface 270 on the spool 236 and the protrusion 272 on the clutching part 246. Through the sliding connection, the clutching part 246 can concurrently rotate about and slide along the longitudinal axis 208 for switching between the disengaged position and the engaged position in response to a rotation of the spool 236. The clutching part 246 is shown in the disengaged position in FIG. 6 and in the engaged position in FIG. 7.

As shown in FIGS. 3 and 4, the clutching part 246 may be connected to a torsion spring 274 that is disposed tightly around the shaft portion 228. The torsion spring 274 can provide some resistance for assisting in keeping the clutching part 246 in the disengaged position.

Referring to FIGS. 3-7, the axle adapter 214 can include a plurality of teeth 276 disposed around the longitudinal axis 208 axially spaced apart from the teeth 266, and the clutching part 246 can include a plurality of teeth 278 disposed around the longitudinal axis 208. The teeth 278 can be engaged with the teeth 276 when the clutching part 246 is in the engaged position, and disengaged from the teeth 276 when the clutching part 246 is in the disengaged position. The teeth 276 may be disposed along a second circumference of the axle adapter 214 at another end of its intermediate portion 248 that is smaller than the first circumference along which are disposed the teeth 266. The teeth 276 and 278 may have a saw-tooth pattern. When the clutching part 246 is in the engaged position, the engagement between the teeth 276 and 278 allows torque transmission from the spool 236 and the clutching part 246 to the axle adapter 214 in only the direction R2 and allows rotation of the spool 236 and the clutching part 246 relative to the axle adapter 214 in the direction R1.

Exemplary operation of the clutching mechanism 222 is described hereinafter with reference to FIGS. 3-7. Supposing that the clutching part 244 is in the engaged position and the clutching part 246 in the disengaged position, which corresponds to a state of the clutching mechanism 222 in which the axle adapter 214 is coupled to the brake engaging part 218 and decoupled from the spool 236. By pulling the operating part 238, the spool 236 can be rotated in the unwinding direction corresponding to the direction R2, which causes the clutching part 246 to slide in a direction D1 from the disengaged position to the engaged position so that the axle adapter 214 is rotationally coupled to the spool 236 via the clutching part 246 for rotation in the direction R2. Owing to the configuration of the teeth 266 and 268, the coupled rotation of the spool 236 and the axle adapter 214 in the direction R2 then can urge the clutching part 244 to slide in a direction D2 opposite to the direction D1 from the engaged position to the disengaged position, whereby the axle adapter 214 can be decoupled from the brake engaging part 218. Accordingly, the clutching mechanism 222 can be switched to a state in which the axle adapter 214 is decoupled from the brake engaging part 218 and coupled to the spool 236 for rotation in the direction R2. In this state, the braking force of the braking spring 216 in the engaged state no longer applies on the axle adapter 214. While the brake engaging part 218 and the clutching part 244 remain generally stationary, the spool 236, the clutching part 246, the axle adapter 214 and the transmission axle 202 can rotate concurrently for raising the movable rail 104.

When the operating part 238 is released after it has been extended from the spool 236, the spring 240 can bias the spool 236 to rotate in the winding direction corresponding to the direction R1 for retracting the operating part 238. The rotation of the spool 236 in the direction R1 causes the clutching part 246 to slide in the direction D2 from the engaged position to the disengaged position so that the axle adapter 214 is rotationally decoupled from the spool 236. The suspended load of the movable rail 104 then may cause the axle adapter 214 to rotate in the direction R1. Owing to the sliding contact between the ramp surface 258 of the clutching part 244 and the ramp surface 262 of the brake engaging part 218 and a frictional contact between the axle adapter 214 and the clutching part 244, the rotational displacement of the axle adapter 214 in the direction R1 causes the clutching part 244 to rotate and slide in the direction D1 from the disengaged position to the engaged position so that the axle adapter 214 is coupled to the brake engaging part 218 via the clutching part 244. As a result, the clutching mechanism 222 can be switched to a state in which the axle adapter 214 is coupled to the brake engaging part 218 and decoupled from the spool 236. In this state, the braking force of the braking spring 216 in the engaged state can apply on the axle adapter 214 to prevent its rotation in the direction R1, whereby the movable rail 104 can be held in position relative to the head rail 102 while the spool 236 rotates in the direction R1 for winding the operating part 238.

In the clutching mechanism 222 described herein, the clutching part 244 thus can slide in the direction D1 and the clutching part 246 in the opposite direction D2 to rotationally couple the axle adapter 214 to the brake engaging part 218 and at the same time rotationally decouple the axle adapter 214 with respect to the spool 236. Conversely, the clutching part 244 can slide in the direction D2 and the clutching part 246 in the opposite direction D1 to rotationally couple the axle adapter 214 to the spool 236 and at the same time rotationally decouple the axle adapter 214 with respect to the brake engaging part 218. Since the axle adapter 214 is coupled to only one of the brake engaging part 218 and the spool 236 at a time, undesirable friction between the axle adapter 214 and the brake engaging part 218 can be prevented when the axle adapter 214 rotates along with the spool 236.

Referring to FIGS. 3 and 8-12, the control module 206 further includes a brake actuating mechanism 302 connected to the braking spring 216. The brake actuating mechanism 302 includes a position selector 304, a switching actuator 306 and a spring 308. The position selector 304 has a first hold position for holding the braking spring 216 in the engaged state, and a second hold position for holding the braking spring 216 in the release state. The switching actuator 306 is movably connected to the housing 210, and is movable relative to the housing 210 between an initial state and an actuating state. The brake actuating mechanism 302 is configured to cause the position selector 304 to switch from the first hold position to the second hold position through a back-and-forth movement of the switching actuator 306 between the initial state and the actuating state, and to cause the position selector 304 to switch from the second hold position to the first hold position through another back-and-forth movement of the switching actuator 306 between the initial state and the actuating state.

Referring to FIGS. 3 and 8-12, the position selector 304 can include a spring coupler 310, an anchoring part 312, an engaging element 314 and a biasing spring 316.

The braking spring 216 can be mounted in frictional contact with the outer surface 234 of the brake engaging part 218 as described previously, and can have two ends 216A and 216B respectively connected to the housing 210 and the spring coupler 310.

The spring coupler 310 is disposed in the housing 210, and is configured to be movable for switching the braking spring 216 between the engaged state and the release state. According to an example of construction, the spring coupler 310 can be disposed for rotation about the longitudinal axis 208 to urge the braking spring 216 to switch between the engaged state and the release state. For example, the spring coupler 310 can have a ring shape pivotally disposed around the intermediate portion 248 of the axle adapter 214. Accordingly, the spring coupler 310 is rotatable about the longitudinal axis 208 relative to the axle adapter 214 to at least a first angular position corresponding to the first hold position and to a second angular position corresponding to the second hold position. The rotation of the spring coupler 310 about the longitudinal axis 208 can displace the end 216B of the braking spring 216 either in one direction that urges the braking spring 216 to enlarge and loosen its frictional contact with the brake engaging part 218, or in an opposite direction that causes the braking spring 216 to tighten its frictional contact with the brake engaging part 218.

Referring to FIGS. 3 and 8-12, the anchoring part 312 is fixed, and the engaging element 314 is movably connected to the spring coupler 310 and the anchoring part 312. The engaging element 314 is movable to engage with different locations of the anchoring part 312 to set the first hold position and the second hold position of the position selector 304.

According to an example of construction, the anchoring part 312 is fixedly connected to the housing 210, e.g., the anchoring part 312 may be fastened to the housing 210 or formed integrally with the housing 210. The anchoring part 312 may be provided on a sidewall of the housing 210 facing the spring coupler 310.

Figure 11:
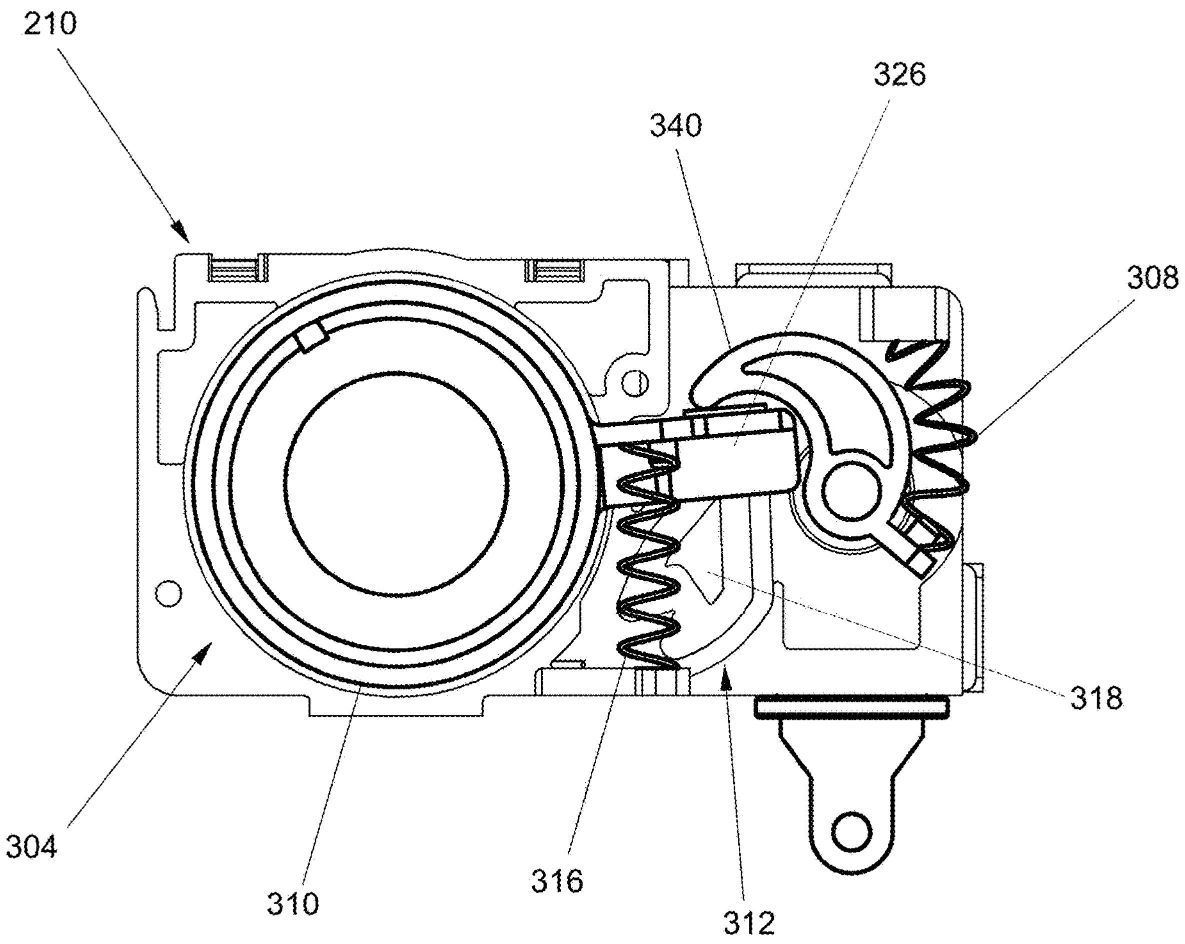
FIG. 11 is a schematic view illustrating some construction details of a position selector provided in the brake actuating mechanism.
Figure 12:
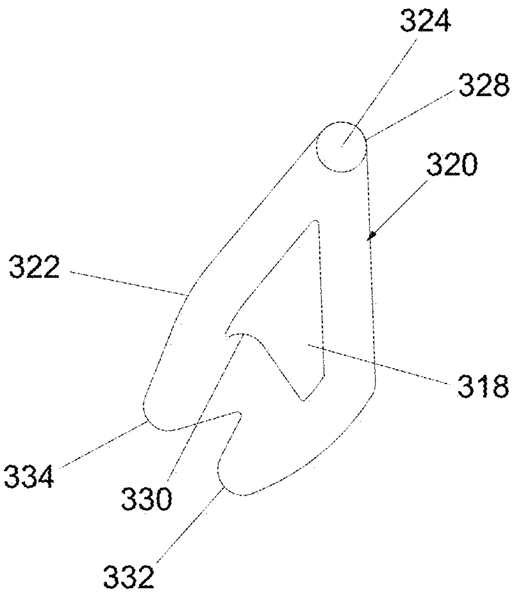
FIG. 12 is a schematic view illustrating further construction details of the position selector including a protrusion of an engaging element guided for sliding along a guide track of an anchoring part.

Referring to FIGS. 3, 11 and 12, the anchoring part 312 can include a protuberance 318, and a closed guide track 320 extending around the protuberance 318, the guide track 320 being defined between the protuberance 318 and an outer sidewall 322 surrounding the protuberance 318. According to an example of construction, the protuberance 318 and the outer sidewall 322 can have a heart-like shape. The protuberance 318 and the outer sidewall 322 may be fixedly connected to the housing 210.

The engaging element 314 is movably connected to the spring coupler 310 at a location eccentric from the longitudinal axis 208, and has a protrusion 324 that is guided for sliding along the guide track 320 of the anchoring part 312. For example, the spring coupler 310 can have a radial extension 326, and the engaging element 314 can be slidably connected to the spring coupler 310 for sliding along the radial extension 326 with the protrusion 324 of the engaging element 314 in sliding contact with the protuberance 318 and the outer sidewall 322 of the anchoring part 312.

The engaging element 314 can be arranged so as to move generally parallel to the anchoring part 312. The engaging element 314 can move orthogonal to the longitudinal axis 208 and along the guide track 320 relative to the spring coupler 310 and the anchoring part 312 as the spring coupler 310 rotates about the longitudinal axis 208 for switching the position selector 304 between the first hold position and the second hold position. The protrusion 324 of the engaging element 314 can be engaged with a concavity 328 in the outer sidewall 322 when the position selector 304 is in the first hold position, and can be engaged with a concavity 330 provided in the protuberance 318 when the position selector 304 is in the second hold position.

Figure 9:
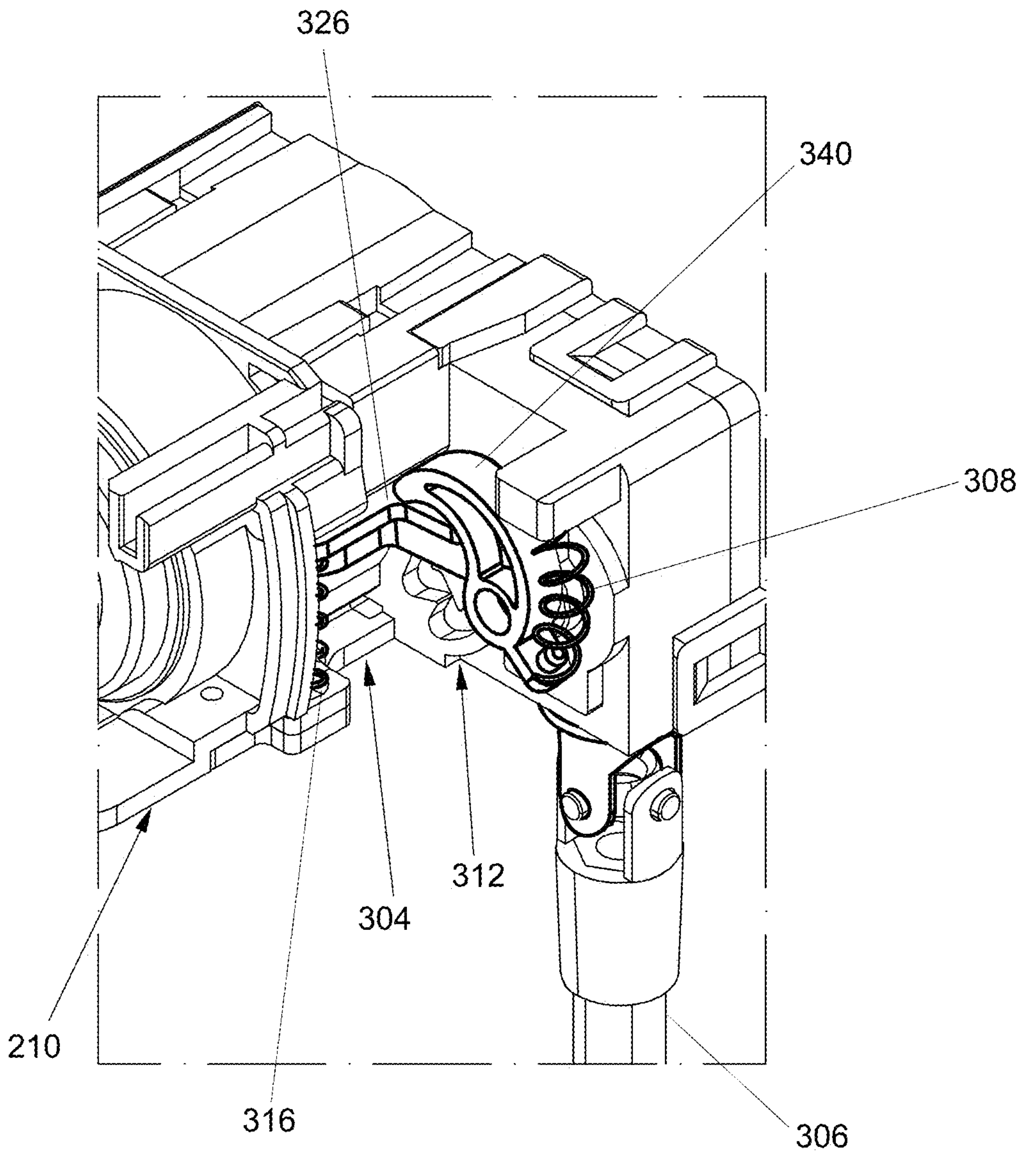
FIG. 9 is an enlarged perspective view illustrating a portion of a brake actuating mechanism provided in the control module of FIG. 3.
Figure 10:
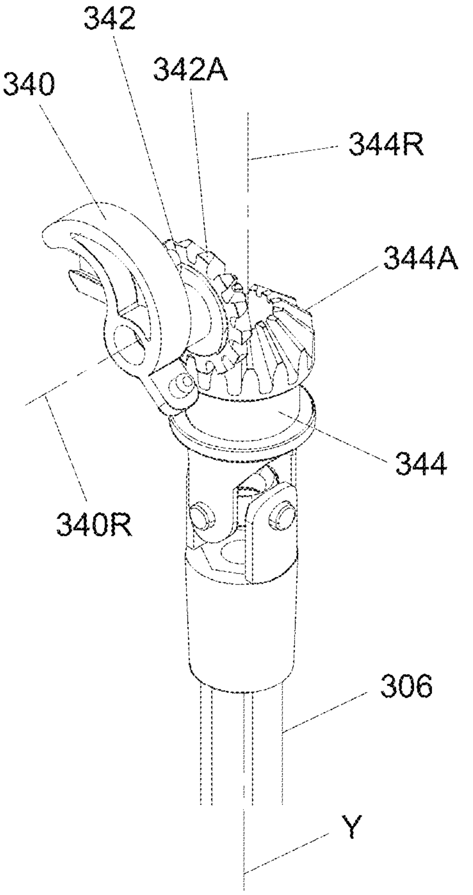
FIG. 10 is a schematic view illustrating a connection between an actuation element and a switching actuator provided in the brake actuating mechanism.

Referring to FIGS. 3, 9 and 11, the biasing spring 316 is connected to the housing 210 and the spring coupler 310, and applies a spring force adapted to urge the spring coupler 310 to rotate about the longitudinal axis 208 in a direction for engaging the position selector 304 in the first hold position or the second hold position. According to an example of construction, the biasing spring 316 may be a coil spring having two ends respectively connected to the housing 210 and the radial extension 326 of the spring coupler 310.

Figure 13A:
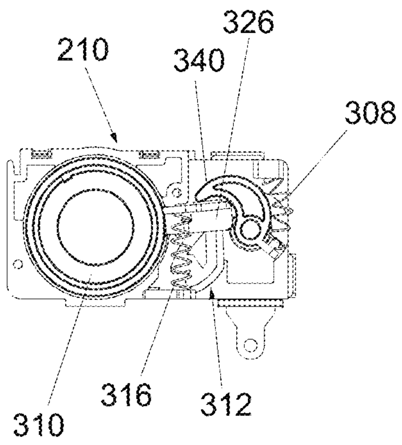
Figure 13B:
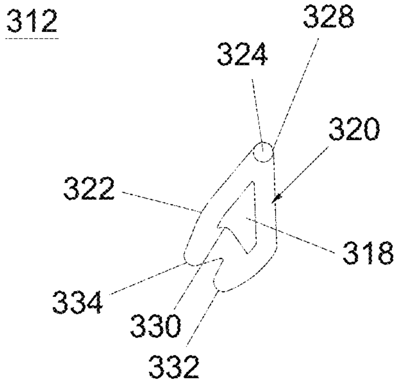

In conjunction with FIGS. 3 and 8-12, FIGS. 13A-17B are schematic views illustrating exemplary operation of the position selector 304. Referring to FIGS. 13A and 13B, the position selector 304 is shown in the first hold position corresponding to the engaged state of the braking spring 216. When the position selector 304 is in the first hold position, the spring coupler 310 is in the first angular position, and the protrusion 324 of the engaging element 314 is engaged with the concavity 328 in the outer sidewall 322. The spring force applied by the biasing spring 316 can bias the spring coupler 310 in a direction that assists in keeping the protrusion 324 of the engaging element 314 engaged with the concavity 328. The first hold position of the position selector 304 can thereby hold the braking spring 216 in the engaged state.

Figure 14A:
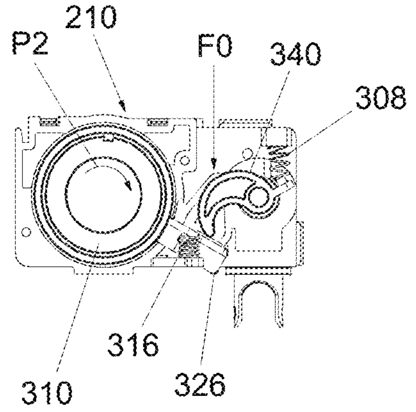
Figure 14B:
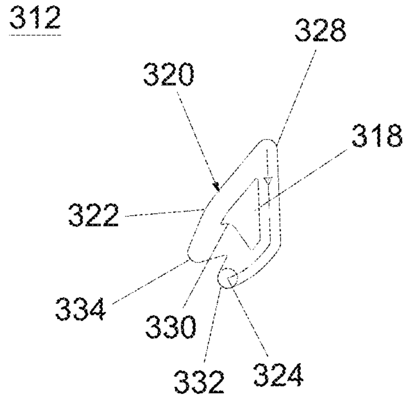

Referring to FIGS. 14A and 14B, for switching the braking spring 216 from the engaged state to the release state, an actuating force FO can be applied on the spring coupler 310 to urge the spring coupler 310 to rotate in a direction P2. As the spring coupler 310 rotates in the direction P2, the protrusion 324 of the engaging element 314 disengages from the concavity 328 of the outer sidewall 322 and can be displaced along the guide track 320 in sliding contact with the protuberance 318 and/or the outer sidewall 322 of the anchoring part 312, which causes a sliding movement of the engaging element 314 relative to the spring coupler 310. The protrusion 324 of the engaging element 314 can slide until it reaches a turn portion 332 in the outer sidewall 322 as shown in FIG. 14B, which can prevent the spring coupler 310 from further rotating in the direction P2. Accordingly, the actuating force FO can be removed.

Figure 15A:
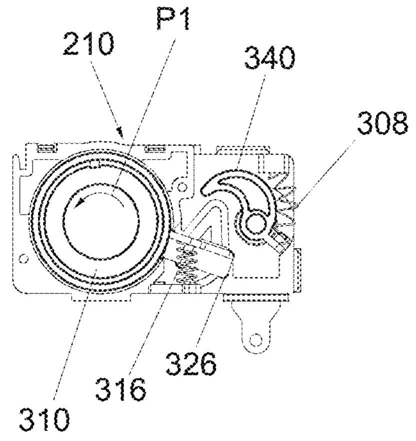
Figure 15B:
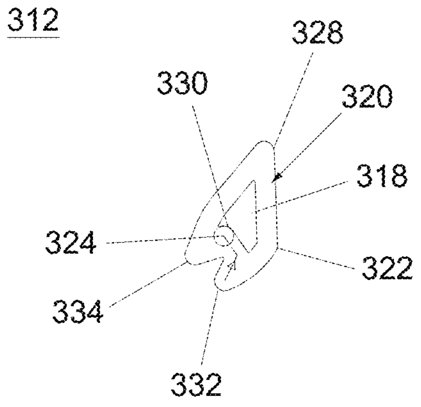

Referring to FIGS. 15A and 15B, as the actuating force FO is removed while the protrusion 324 of the engaging element 314 is located at the turn portion 332 of the outer sidewall 322, the biasing spring 316 can urge the spring coupler 310 to rotate in a direction P1 opposite to the direction P2, which causes the protrusion 324 of the engaging element 314 to move away from the turn portion 332 of the outer sidewall 322 and engage with the concavity 330 in the protuberance 318. The engagement of the protrusion 324 with the concavity 330 can prevent the spring coupler 310 from further rotating in the direction P1, whereby the spring coupler 310 can be kept in the second angular position corresponding to the second hold position of the position selector 304. The second hold position of the position selector 304 can thereby hold the braking spring 216 in the release state.

Figure 16A:
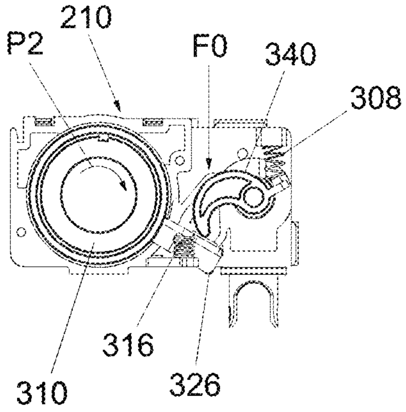
FIGS. 16A and 17A are schematic views illustrating exemplary operation for switching the position selector from the second hold position to the first hold position.
Figure 16B:
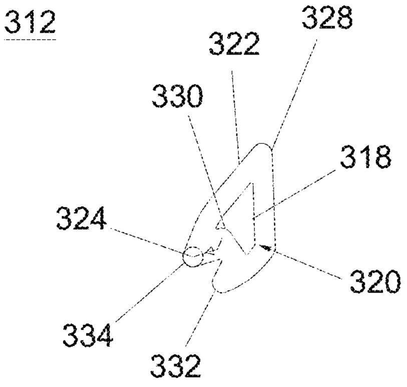
FIGS. 16B and 17B are schematic views illustrating the protrusion of the engaging element moved to different positions along the guide track of the anchoring part during switching of the position selector from the second hold position to the first hold position.

Referring to FIGS. 16A and 16B, for switching the braking spring 216 from the release state to the engaged state, an actuating force FO can be likewise applied on the spring coupler 310 to urge the spring coupler 310 to rotate in the direction P2. As the spring coupler 310 rotates in the direction P2, the protrusion 324 of the engaging element 314 can disengage from the concavity 330 of the protuberance 318 and move in sliding contact with a ramp surface of the outer sidewall 322 until the protrusion 324 reaches another turn portion 334 of the outer sidewall 322. When the protrusion 324 reaches the turn portion 334 of the outer sidewall 322, the spring coupler 310 is prevented from further rotating in the direction P2. Accordingly, the actuating force FO can be removed.

Figure 17A:
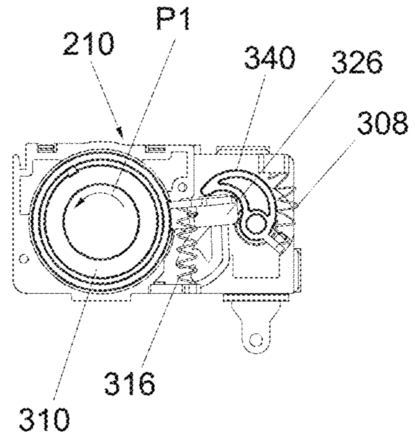
Figure 17B:
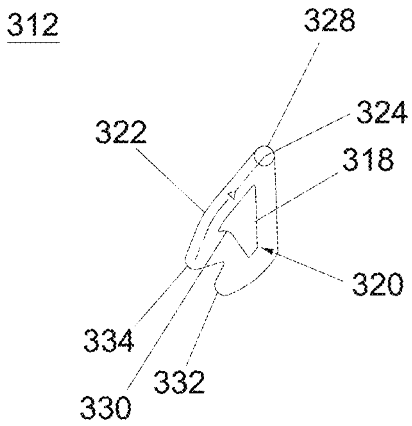
Figure 18:
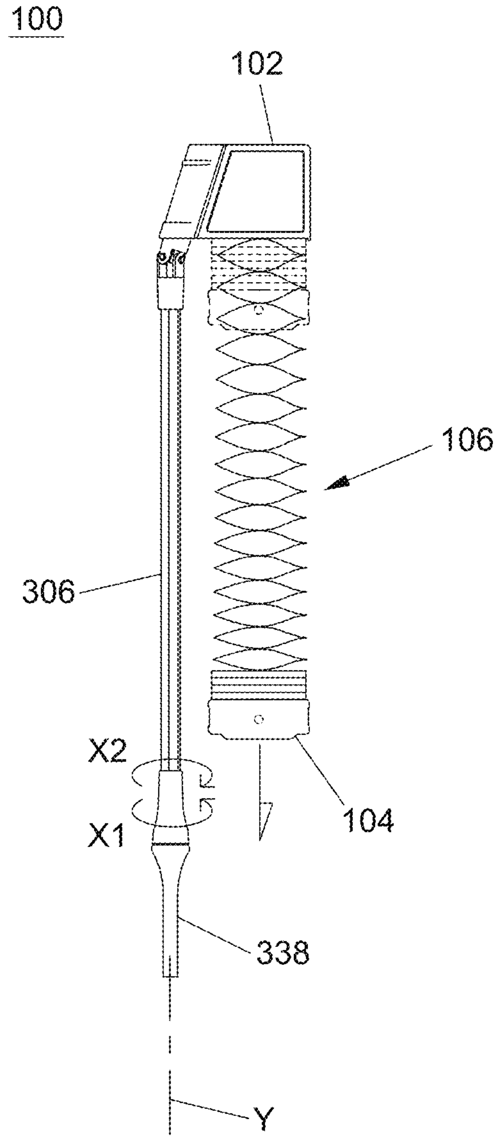
FIGS. 18 and 19 are schematic views illustrating exemplary operation for expanding the window shade of FIG. 1.
Figure 19:
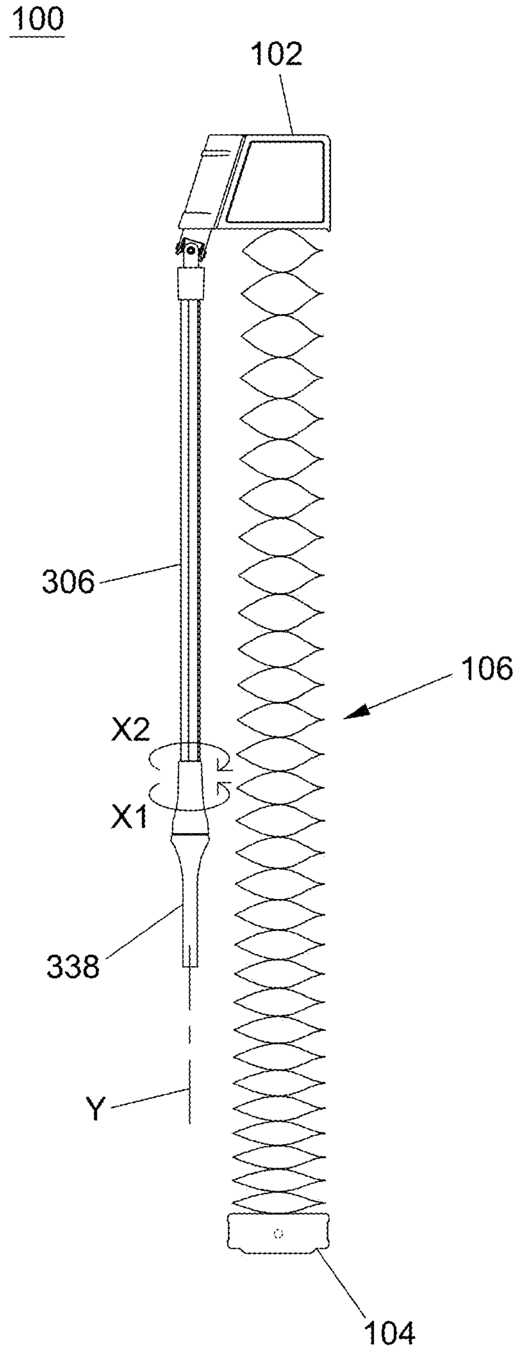
Figure 20:
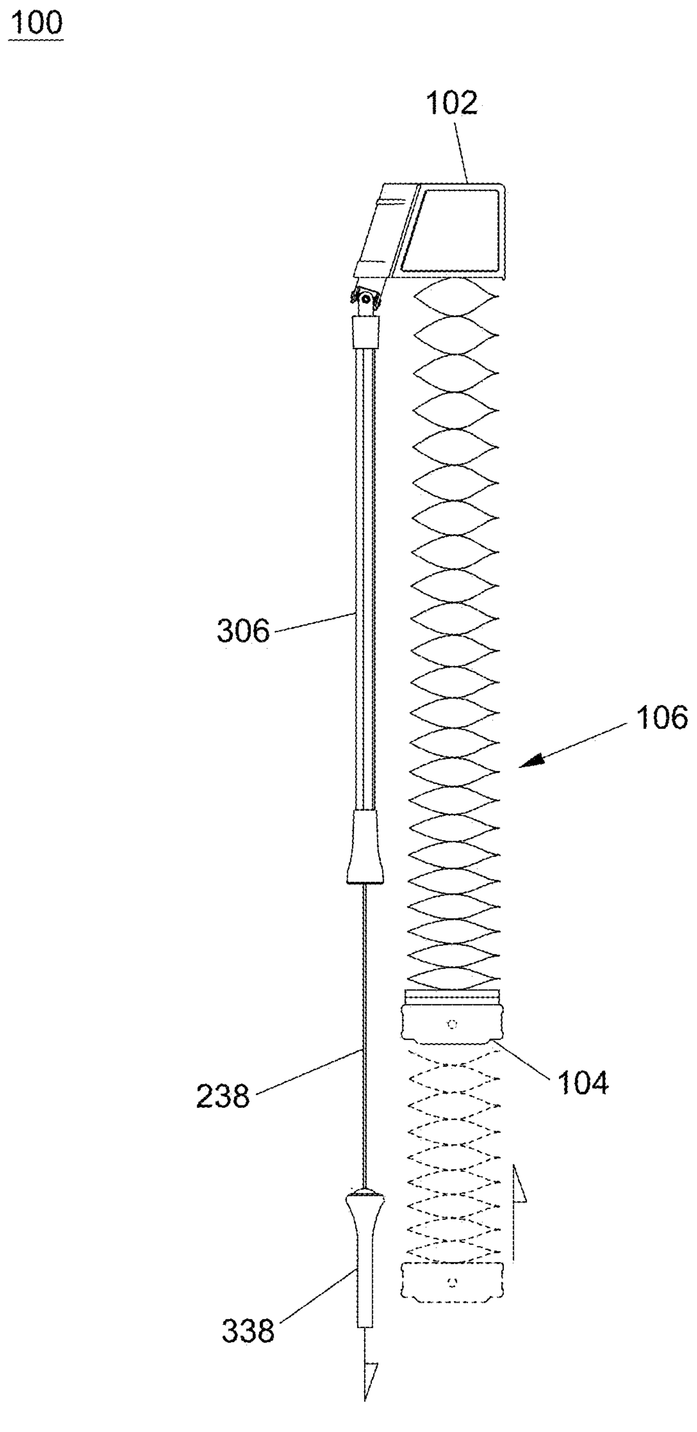
FIGS. 20 and 21 are schematic views illustrating exemplary operation for raising the movable rail of the window shade of FIG. 1.
Figure 21:
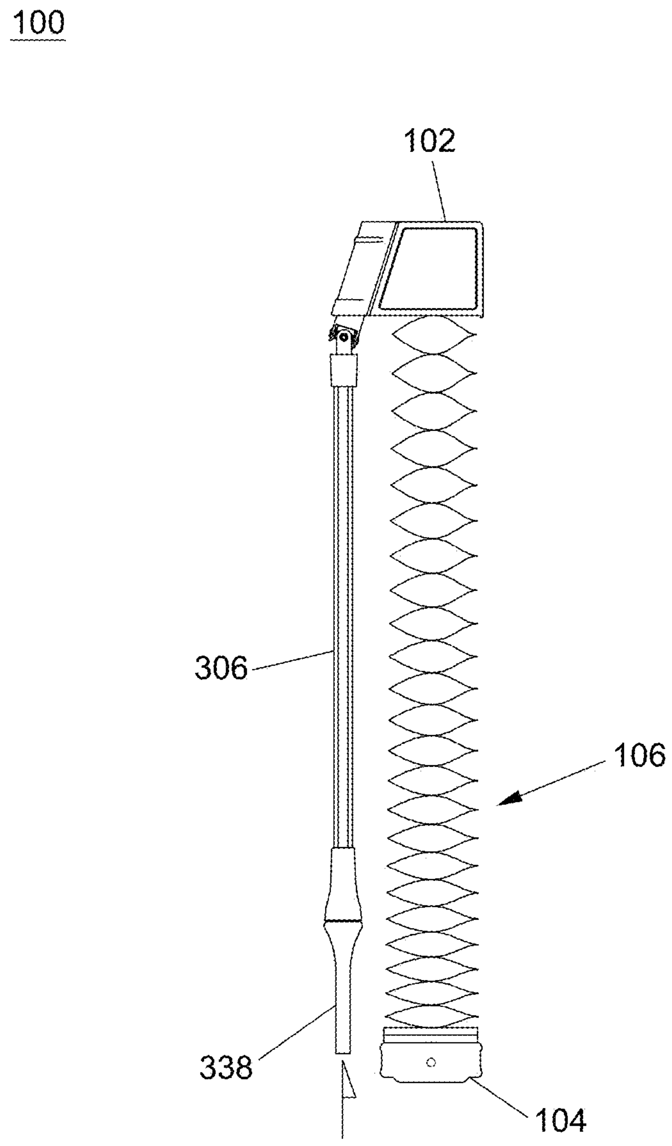

Referring to FIGS. 17A and 17B, as the actuating force FO is removed while the protrusion 324 of the engaging element 314 is located at the turn portion 334 of the outer sidewall 322, the biasing spring 316 can urge the spring coupler 310 to rotate in the direction P1, which causes the protrusion 324 of the engaging element 314 to move away from the turn portion 334 of the outer sidewall 322 and slide along the guide track 320 until the protrusion 324 engages with the concavity 328 of the outer sidewall 322. The position selector 304 can be thereby switched to the first hold position to hold the braking spring 216 in the engaged state.

Referring to FIGS. 3 and 8-17B, the switching actuator 306 is movably connected to the housing 210, and is operable to actuate the position selector 304. The switching actuator 306 may include any structures that can facilitate manual operation. For example, the switching actuator 306 may include a wand that extends along a lengthwise axis Y and is exposed for operation. The operating part 238 may be threaded through a hollow interior of the wand of the switching actuator 306, and may have an end anchored to a handle 338. The handle 338 is disposed adjacent to a distal end of the switching actuator 306, and can be pulled away from the switching actuator 306 for extending the operating part 238 from the spool 236. A guide element 287 may be provided inside the housing 210 for guiding the operating part 238.

Referring to FIGS. 3, 9-12, 14A and 16A, for facilitating the actuation of the position selector 304, the brake actuating mechanism 302 can include an actuation element 340 that is movably linked to the switching actuator 306 and is operable to apply the actuating force FO on the spring coupler 310 or remove the actuating force FO. A movement of the switching actuator 306 from the initial state to the actuating state can drive the actuation element 340 to move toward the spring coupler 310, whereby the actuation element 340 can contact the spring coupler 310 and apply thereon the actuating force FO to urge the spring coupler 310 to rotate in the direction P2 against the spring force of the biasing spring 316. Conversely, a movement of the switching actuator 306 from the actuating state to the initial state can drive the actuation element 340 to move away from the spring coupler 310 for removing the actuating force FO.

According to an example of construction, the connection between the switching actuator 306 and the housing 210 allows rotation of the switching actuator 306 about the lengthwise axis Y thereof relative to the housing 210, and the actuation element 340 is movably linked to the switching actuator 306 via a plurality of transmission elements. The actuation element 340 can be pivotally connected to the housing 210 about a pivot axis 340R, which can be parallel to the longitudinal axis 208. The actuation element 340 may be in the form of a lever, and can contact the spring coupler 310 at the radial extension 326 thereof.

The actuation element 340 can be movably linked to the switching actuator 306 via two transmission elements 342 and 344. The transmission element 342 has a gear portion 342A, and is rotationally locked to the actuation element 340 for concurrent rotation about the pivot axis 340R. The transmission element 344 is pivotally connected to the housing 210 about a pivot axis 344R, has a gear portion 344A engaged with the gear portion 342A of the transmission element 342, and is pivotally connected to the switching actuator 306. According to an example of construction, the pivot axes 340R and 344R are orthogonal to each other, and the gear portions 342A and 344A can be bevel gears. The pivotal connection between the transmission element 344 and the switching actuator 306 allows to modify the inclination of the switching actuator 306 for facilitating its operation.

With the aforementioned arrangement, the switching actuator 306 is rotatable about the lengthwise axis Y to drive the actuation element 340 to rotate about the pivot axis 340R toward or away from the spring coupler 310. More specifically, a rotational displacement of the switching actuator 306 from the initial state to the actuating state causes the actuation element 340 to rotate and apply the actuating force FO (as shown in FIG. 14A or 16A) on the radial extension 326 of the spring coupler 310, which urges the spring coupler 310 to rotate in the direction P2 against the spring force of the biasing spring 316. Conversely, a rotational displacement of the switching actuator 306 from the actuating state to the initial state is linked to a rotational displacement of the actuation element 340 away from the radial extension 326 of the spring coupler 310 for removing the actuating force FO.

Referring to FIGS. 3 and 9-17B, the spring 308 is configured to urge the switching actuator 306 to move from the actuating state to the initial state and thereby assist in removing the actuating force FO. According to an example of construction, the spring 308 can have two ends respectively connected to the housing 210 and the actuation element 340. The spring force applied by the spring 308 is adapted to urge the actuation element 340 to rotate and move away from the radial extension 326 of the spring coupler 310, which causes the switching actuator 306 to move from the actuating state to the initial state.

In conjunction with FIGS. 1-17B, FIGS. 18 and 19 are schematic views illustrating exemplary operation for expanding the window shade 100 provided with the actuating system 200 described previously. Referring to FIGS. 1, 3-12 and 13A-13B, supposing that the movable rail 104 is initially held in position relative to the head rail 102. In this initial state, the axle adapter 214 is decoupled from the spool 236 and coupled to the brake engaging part 218 via the clutching part 244, and the braking spring 216 is in the engaged state. The tightening action exerted by the braking spring 216 on the brake engaging part 218 can prevent rotation of the axle adapter 214 and the transmission axle 202 in a direction that would lower the movable rail 104. Moreover, the position selector 304 is in the first hold position and can hold the braking spring 216 in the engaged state.

Referring to FIGS. 3-12, 14A-14B, 15A-15B and 18, when the window shade 100 is to be expanded, a user can rotate the switching actuator 306 about its lengthwise axis Y in one direction X1 from the initial state to the actuating state, and then release the switching actuator 306 so that the spring 308 urges the switching actuator 306 to rotate in the opposite direction X2 from the actuating state to the initial state. As described previously, this back-and-forth movement of the switching actuator 306 between the initial state and the actuating state can actuate the position selector 304, which switches from the first hold position to the second hold position and consequently turns the braking spring 216 from the engaged state to the release state for loosening the frictional contact with the brake engaging part 218. As a result, the transmission axle 202, the axle adapter 214, the brake engaging part 218, and the clutching part 244 in the engaged position can rotate concurrently relative to the braking spring 216 for lowering the movable rail 104 by gravity action. The spool 236 and the clutching part 246 can remain generally stationary while the axle adapter 214 and the transmission axle 202 continuously rotate for lowering the movable rail 104.

Referring to FIGS. 3-12, 16A-16B, 17A-17B and 19, when the movable rail 104 moving downward reaches a desired position, the user can repeat the same operation of rotating the switching actuator 306 about the lengthwise axis Y in the direction X1 from the initial state to the actuating state, and then release the switching actuator 306 so that the spring 308 urges the switching actuator 306 to rotate in the opposite direction X2 from the actuating state to the initial state. This back-and-forth movement of the switching actuator 306 between the initial state and the actuating state can actuate again the position selector 304, which switches from the second hold position to the first hold position and consequently turns the braking spring 216 from the release state to the engaged state. The movable rail 104 can be thereby held in the desired position relative to the head rail 102.

In conjunction with FIGS. 3-8, FIGS. 20 and 21 are schematic views illustrating exemplary operation for raising the movable rail 104 of the window shade 100 provided with the actuating system 200 described previously. Referring to FIGS. 3-8 and 20, when a user wants to raise the movable rail 104, the operating part 238 can be pulled downward with the handle 338 while the switching actuator 306 remains in the initial state, which causes the spool 236 to rotate in the unwinding direction. As a result, the clutching mechanism 222 is switched to the state in which the axle adapter 214 is decoupled from the brake engaging part 218 and coupled to the spool 236 via the clutching part 246 like previously described. Accordingly, the transmission axle 202, the axle adapter 214 and the spool 236 can rotate concurrently for raising the movable rail 104, while the braking spring 216 remains in the engaged state.

Referring to FIGS. 3-8 and 21, the user can release the handle 338 when the movable rail 104 has reached a desired position or when the operating part 238 has extended a maximum length. As a result, the spool 236 rotates for winding the operating part 238 owing to the action of the spring 240, and the clutching mechanism 222 is switched to the state in which the axle adapter 214 is decoupled from the spool 236 and coupled to the brake engaging part 218 via the clutching part 244 like previously described. Accordingly, the tightening action exerted by the braking spring 216 on the brake engaging part 218 can prevent rotation of the axle adapter 214 and the transmission axle 202 so that the movable rail 104 is held in position while the spool 236 rotates in the winding direction.

The aforementioned actuation and release of the operating part 238 can be repeated multiple times until the movable rail 104 rises to a desired position. The switching actuator 306 can remain in the initial state during the aforementioned operation for raising the movable rail 104.

Figure 22:
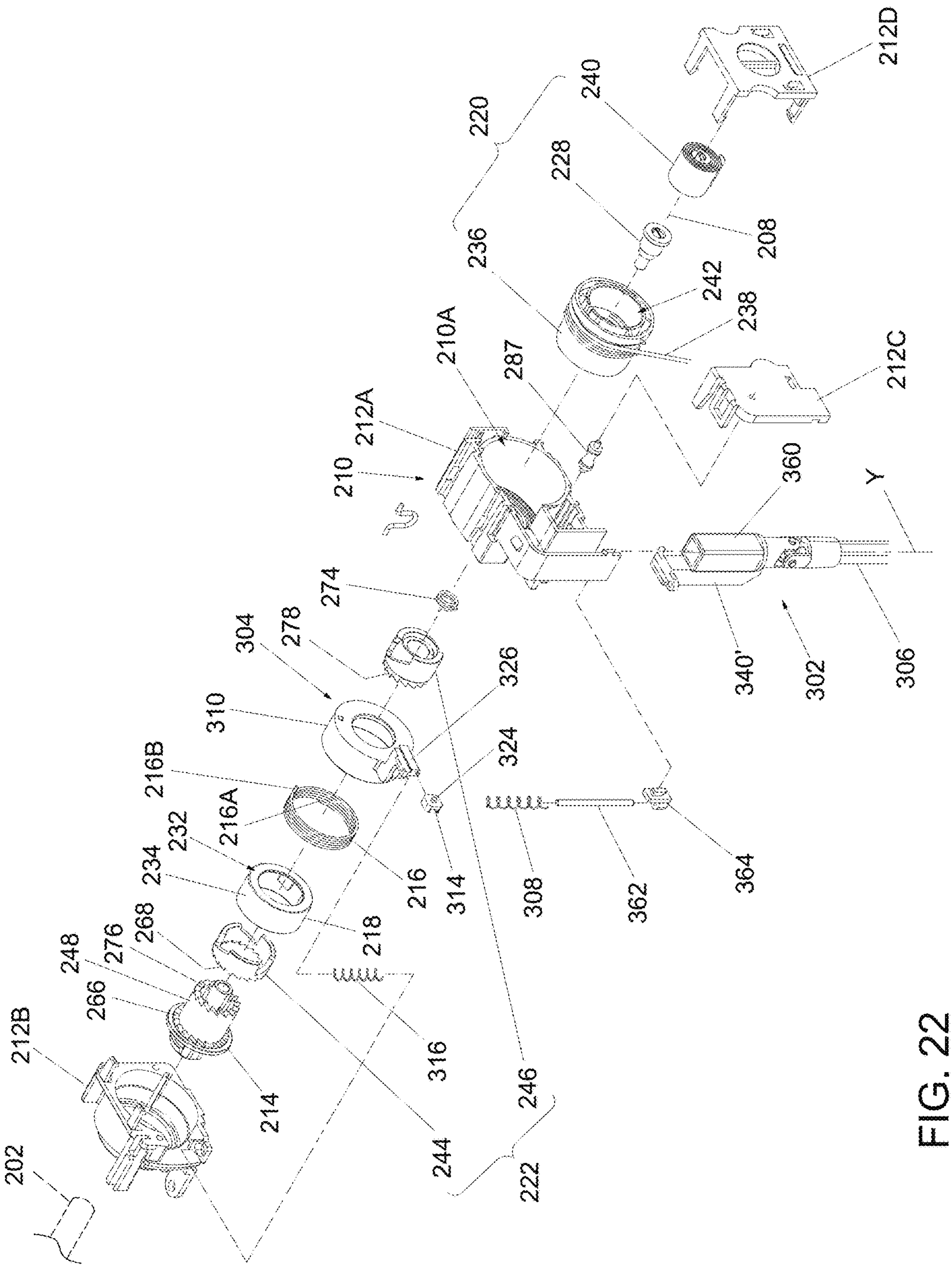
FIG. 22 is an exploded view illustrating a variant construction of a control module provided in an actuating system for a window shade.
Figure 23:
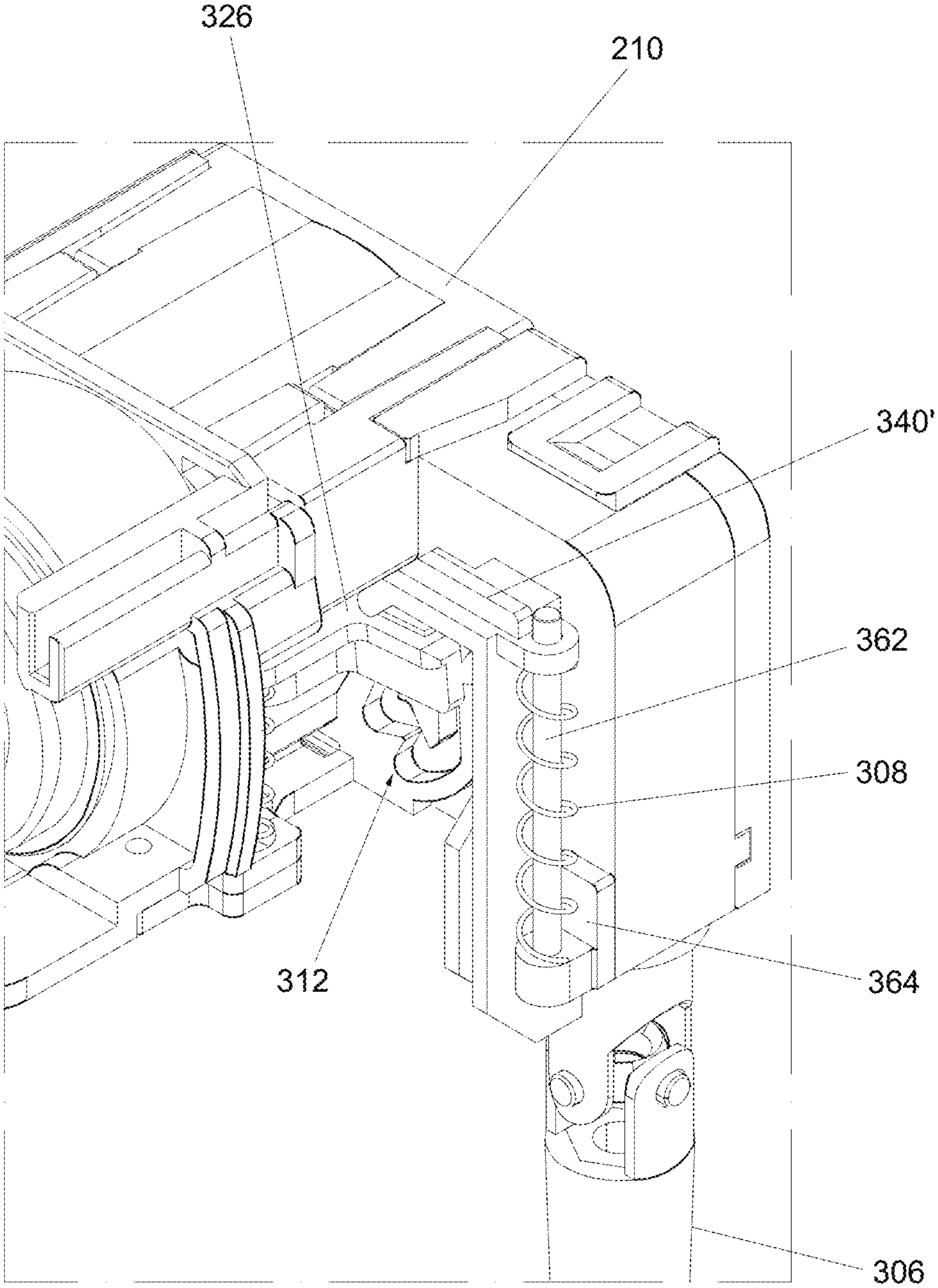
FIG. 23 is an enlarged perspective view illustrating a portion of the control module shown in FIG. 22 including an actuation element and a position selector.
Figure 24:
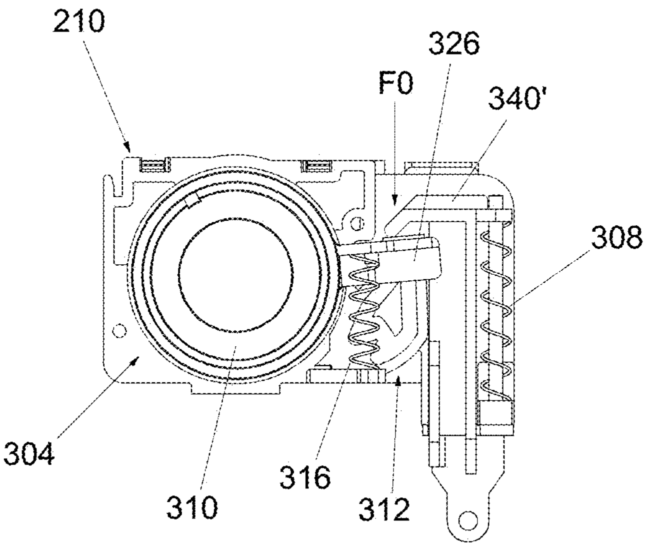
FIG. 24 is a schematic side view of the portion shown in FIG. 23.

FIG. 22 is an exploded view illustrating a variant construction of the control module 206 in which the actuation element 340 previously described is replaced with an actuation element 340', and FIGS. 23 and 24 are an enlarged perspective view and a schematic side view illustrating a portion of the control module 206 shown in FIG. 22 including the actuation element 340' and the position selector 304. Rather than rotating about the lengthwise axis Y, the switching actuator 306 in the embodiment of FIGS. 22-24 is configured to slide vertically relative to the housing 210 between the initial state and the actuating state for actuating the position selector 304.

Referring to FIGS. 22-24, the switching actuator 306 can be slidably connected to the housing 210 via a slider 360. For example, the slider 360 can be fixedly connected to an upper end of the switching actuator 306, and can be slidably received in a channel provided inside the housing 210. The switching actuator 306 and the slider 360 can slide in unison upward and downward relative to the housing 210.

The actuation element 340' can be fixedly connected to the switching actuator 306 and the slider 360, and can be disposed adjacent to the slider 360. The actuation element 340' may have a hook portion, and can contact the spring coupler 310 at the radial extension 326 thereof. Since the switching actuator 306 and the actuation element 340' are fixedly connected to each other, the transmission elements 342 and 344 of the previous embodiment can be omitted.

Like in the previous embodiment, the actuation element 340' can be connected to the spring 308, which can apply a spring force adapted to urge the actuation element 340' to move away from the radial extension 326 of the spring coupler 310 and cause the switching actuator 306 to move from the actuating state to the initial state. According to an example of construction, the housing 210 may be fixedly connected to a guide rod 362 via a bracket 364, the actuation element 340' can be disposed for sliding along the guide rod 362, and the spring 308 can be disposed around the guide rod 362 with two opposite ends of the spring 308 respectively connected to the actuation element 340' and the bracket 364.

Referring to FIGS. 22-24, a downward sliding displacement of the switching actuator 306 from the initial state to the actuating state can drive the actuation element 340' to slide downward and apply the actuating force FO on the radial extension 326 of the spring coupler 310, which urges the spring coupler 310 to rotate against the spring force of the biasing spring 316. Conversely, an upward sliding displacement of the switching actuator 306 from the actuating state to the initial state is linked to a sliding displacement of the actuation element 340' away from the radial extension 326 of the spring coupler 310 for removing the actuating force FO. The switching actuator 306 and the actuation element 340' shown in FIGS. 22-24 thus have the same actuating function as the switching actuator 306 and the actuation element 340 of the previous embodiment.

Aside the actuation element 340', the remaining components of the control module 206 shown in FIG. 22 can be similar in construction and operation to the previous embodiment shown in FIG. 3.

In conjunction with FIGS. 22-24, FIG. 25 is a schematic view illustrating exemplary operation for expanding the window shade 100 provided with the control module 206 shown in FIG. 22. Referring to FIGS. 22-25, when the window shade 100 is to be expanded, a user can pull the switching actuator 306 downward in a direction V1 from the initial state to the actuating state, and then release the switching actuator 306 so that the spring 308 urges the switching actuator 306 to slide upward in the opposite direction V2 from the actuating state to the initial state. Like described previously, this back-and-forth movement of the switching actuator 306 between the initial state and the actuating state can actuate the position selector 304, which switches from the first hold position to the second hold position and consequently turns the braking spring 216 from the engaged state to the release state for loosening the frictional contact with the brake engaging part 218. As a result, the transmission axle 202, the axle adapter 214, the brake engaging part 218, and the clutching part 244 in the engaged position can rotate concurrently relative to the braking spring 216 for lowering the movable rail 104 by gravity action.

When the movable rail 104 moving downward reaches a desired position, the user can repeat the same operation of pulling the switching actuator 306 downward in the direction V1 from the initial state to the actuating state, and then release the switching actuator 306 so that the spring 308 urges the switching actuator 306 to slide upward in the opposite direction V2 from the actuating state to the initial state. This back-and-forth movement of the switching actuator 306 between the initial state and the actuating state can actuate again the position selector 304, which switches from the second hold position to the first hold position and consequently turns the braking spring 216 from the release state to the engaged state. The movable rail 104 can be thereby held in the desired position relative to the head rail 102.

Figure 25:
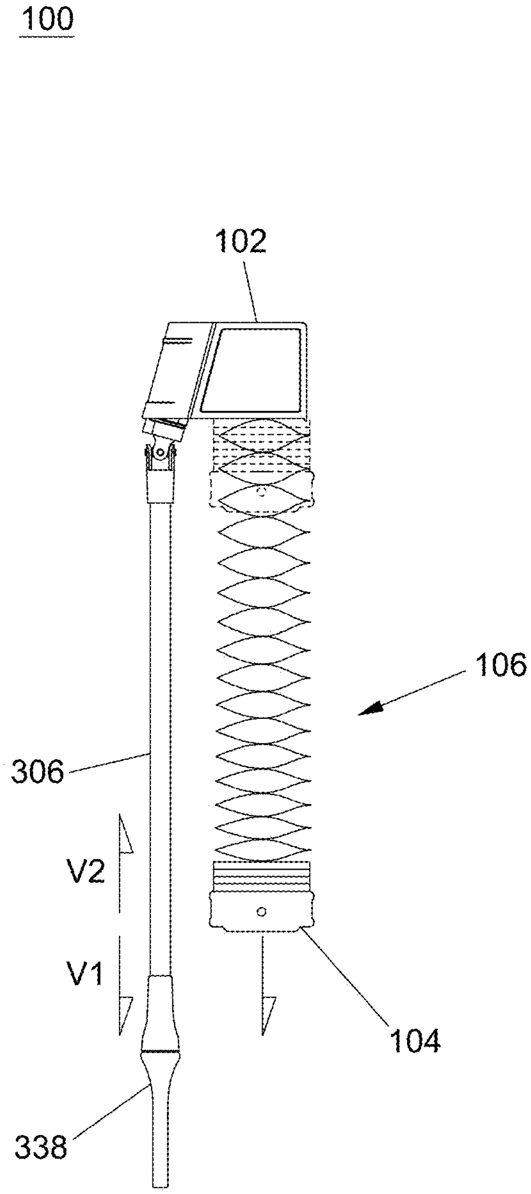
FIG. 25 is a schematic view illustrating exemplary operation for expanding a window shade provided with the control module shown in FIG. 22.

For retracting the window shade 100 shown in FIG. 25, the movable rail 104 can be raised by pulling and releasing the handle 338 like previously described.

Advantages of the structures described herein include the ability to provide an actuating system that is conveniently operable to lower and raise a movable rail of a window shade with reduced effort. Moreover, the actuating system is adaptable for use with different types of window shades, which can simplify the manufacture of window shades.

Realization of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
a transmission axle rotatable about a longitudinal axis thereof;
a braking spring having an engaged state adapted to prevent rotation of the transmission axle, and a release state allowing rotation of the transmission axle; and
a brake actuating mechanism connected to the braking spring, the brake actuating mechanism including a switching actuator movable between an initial state and an actuating state, and a position selector having a first hold position for holding the braking spring in the engaged state and a second hold position for holding the braking spring in the release state;
wherein the brake actuating mechanism is configured to cause the position selector to switch from the first hold position to the second hold position through a back-and-forth movement of the switching actuator between the initial state and the actuating state, and to cause the position selector to switch from the second hold position to the first hold position through another back-and-forth movement of the switching actuator between the initial state and the actuating state.

2. The actuating system according to claim 1, wherein the switching actuator includes a wand.

3. A window shade comprising:
a head rail, a movable rail, and a shading structure disposed between the head rail and the movable rail;
a winding unit assembled with the head rail, the winding unit being connected to the movable rail via a suspension element; and
the actuating system according to claim 1, wherein the transmission axle is rotationally coupled to the winding unit, the transmission axle being rotatable for raising and lowering the movable rail.

4. The actuating system according to claim 1, further comprising a brake engaging part, the braking spring being in frictional contact with the brake engaging part in the engaged state and loosening the frictional contact with the brake engaging part in the release state.

5. The actuating system according to claim 4, further comprising:
an axle adapter rotationally coupled to the transmission axle;
a lift actuating module including a spool connected to an operating part, the spool being rotatable in a winding direction to wind the operating part and in an unwinding direction to unwind the operating part; and
a clutching mechanism configured to selectively couple the axle adapter to either one of the spool and the brake engaging part, wherein the spool and the axle adapter are concurrently rotatable relative to the brake engaging part when the axle adapter is decoupled from the brake engaging part and coupled to the spool, and the engaged state of the braking spring is adapted to prevent a rotation of the transmission axle when the axle adapter is coupled to the brake engaging part and decoupled from the spool.

6. The actuating system according to claim 1, wherein the position selector includes a spring coupler connected to an end of the braking spring, the spring coupler being rotatable about the longitudinal axis to a first angular position corresponding to the first hold position and to a second angular position corresponding to the second hold position.

7. The actuating system according to claim 6, wherein the position selector further includes:
an anchoring part; and
an engaging element movably connected to the spring coupler and the anchoring part;
wherein the engaging element is movable to engage with different locations of the anchoring part to set the first hold position and the second hold position.

8. The actuating system according to claim 7, wherein the spring coupler is disposed inside a housing, and the anchoring part is fixedly connected to the housing.

9. The actuating system according to claim 7, wherein the engaging element is movably connected to the spring coupler at a location eccentric from the longitudinal axis.

10. The actuating system according to claim 7, wherein the anchoring part includes a protuberance, and a guide track extending around the protuberance, the guide track being defined between the protuberance and an outer sidewall surrounding the protuberance, and the engaging element having a protrusion that is guided for sliding along the guide track.

11. The actuating system according to claim 10, wherein the engaging element moves relative to the spring coupler and along the guide track as the spring coupler rotates about the longitudinal axis.

12. The actuating system according to claim 10, wherein the protrusion of the engaging element is engaged with a concavity in the outer sidewall when the position selector is in the first hold position.

13. The actuating system according to claim 10, wherein the protrusion of the engaging element is engaged with a concavity in the protuberance when the position selector is in the second hold position.

14. The actuating system according to claim 7, wherein the position selector further includes a biasing spring connected to the spring coupler, the biasing spring being adapted to urge the spring coupler to rotate in a first direction for engaging the position selector in the first hold position or the second hold position.

15. The actuating system according to claim 14, wherein the brake actuating mechanism further includes an actuation element movably linked to the switching actuator, a movement of the switching actuator from the initial state to the actuating state causing the actuation element to urge the spring coupler to rotate in a second direction opposite to the first direction, the engaging element moving relative to the spring coupler and the anchoring part as the spring coupler rotates about the longitudinal axis for switching the position selector between the first hold position and the second hold position.

16. The actuating system according to claim 15, wherein the engaging element is slidably connected to the spring coupler.

17. The actuating system according to claim 15, wherein the brake actuating mechanism further includes a spring adapted to urge the switching actuator to move from the actuating state to the initial state.

18. The actuating system according to claim 15, wherein the switching actuator is rotatable between the initial state and the actuating state.

19. The actuating system according to claim 15, wherein the switching actuator is slidable between the initial state and the actuating state.

* * * * *